(12) United States Patent
Suzuki

(10) Patent No.: US 11,795,889 B2
(45) Date of Patent: Oct. 24, 2023

(54) INTERNAL COMBUSTION ENGINE CONTROL DEVICE

(71) Applicant: Hitachi Astemo, Ltd., Hitachinaka (JP)

(72) Inventor: Kunihiko Suzuki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/426,961

(22) PCT Filed: Feb. 7, 2020

(86) PCT No.: PCT/JP2020/004730
§ 371 (c)(1),
(2) Date: Jul. 29, 2021

(87) PCT Pub. No.: WO2020/189080
PCT Pub. Date: Sep. 24, 2020

(65) Prior Publication Data
US 2022/0099043 A1    Mar. 31, 2022

(30) Foreign Application Priority Data
Mar. 20, 2019   (JP) ................... 2019-053089

(51) Int. Cl.
*F01N 11/00* (2006.01)
*F02D 41/24* (2006.01)

(52) U.S. Cl.
CPC ........ *F02D 41/2438* (2013.01); *F01N 11/002* (2013.01); *F01N 11/007* (2013.01);
(Continued)

(58) Field of Classification Search
CPC ............. F02D 41/2438; F02D 41/2474; F02D 2200/0802; F01N 11/002; F01N 11/007; F01N 2550/02
See application file for complete search history.

(56) References Cited

U.S. PATENT DOCUMENTS

| | | | |
|---|---|---|---|
| 5,435,290 A * | 7/1995 | Gopp ................. | F02D 41/28 |
| | | | 123/694 |
| 5,609,023 A | 3/1997 | Katoh et al. | |

(Continued)

FOREIGN PATENT DOCUMENTS

| | | |
|---|---|---|
| EP | 1 300 571 A1 | 4/2003 |
| EP | 1 681 448 A1 | 7/2006 |

(Continued)

OTHER PUBLICATIONS

International Search Report (PCT/ISA/210) issued in PCT Application No. PCT/JP2020/004730 dated Jun. 2, 2020 with English translation (four (4) pages).

(Continued)

*Primary Examiner* — Matthew T Largi
(74) *Attorney, Agent, or Firm* — Crowell & Moring LLP

(57) ABSTRACT

To keep catalyst purification efficiency high and prevent deterioration of emission performance. Therefore, an internal combustion engine control device according to an aspect of the present invention includes: an oxygen storage ratio calculation unit that calculates an oxygen storage ratio of a catalyst based on a catalytic reaction model having at least a detection value of a first exhaust gas sensor disposed on an upstream side of the catalyst as an input; a statistical model calculation unit that predicts a catalyst downstream exhaust gas concentration using a statistical model having an oxygen storage ratio as an input and a catalyst downstream exhaust gas concentration as an output; and an air-fuel ratio correction amount calculation unit that calculates an air-fuel ratio correction amount of an air-fuel mixture of an internal combustion engine based on a future catalyst downstream exhaust gas concentration calculated by the statistical model calculation unit.

13 Claims, 23 Drawing Sheets

(52) U.S. Cl.
CPC ...... *F02D 41/2474* (2013.01); *F01N 2550/02* (2013.01); *F02D 2200/0802* (2013.01)

(56) References Cited

U.S. PATENT DOCUMENTS

| | | | | |
|---|---|---|---|---|
| 6,223,525 | B1* | 5/2001 | Takanohashi | F01N 3/0842 60/285 |
| 6,415,273 | B1* | 7/2002 | Fujime | F02D 41/1405 706/903 |
| 10,859,018 | B1* | 12/2020 | Lee | F01N 3/101 |
| 2003/0093993 | A1 | 5/2003 | Lutz et al. | |
| 2004/0139736 | A1* | 7/2004 | Yoshizawa | F02D 41/1479 60/285 |
| 2007/0261390 | A1* | 11/2007 | Chino | F01N 11/007 60/285 |
| 2007/0261960 | A1* | 11/2007 | Aoki | G01N 27/4077 123/319 |
| 2013/0245919 | A1* | 9/2013 | Kumar | F02D 41/0295 701/104 |
| 2016/0017831 | A1* | 1/2016 | Nakagawa | F02D 41/1477 60/285 |
| 2018/0112568 | A2 | 4/2018 | Odendall | |

FOREIGN PATENT DOCUMENTS

| | | | |
|---|---|---|---|
| JP | 7-151002 | A | 6/1995 |
| JP | 2002-349325 | A | 12/2002 |
| JP | 2011-174426 | A | 9/2011 |
| JP | 2011174426 | A * | 9/2011 |
| JP | 2012112301 | A * | 6/2012 |
| WO | WO 02/070884 | A1 | 9/2002 |

OTHER PUBLICATIONS

Japanese-language Written Opinion (PCT/ISA/237) issued in PCT Application No. PCT/JP2020/004730 dated Jun. 2, 2020 (four (4) pages).
Supplementary European Search Report issued in European Application No. 20773490.6 dated Jul. 22, 2022 (seven (7) pages).
Chinese-language Office Action issued in Chinese Application No. 202080006633.7 dated Jun. 29, 2022 with English translation (13 pages).
Japanese-language Office Action issued in Japanese Application No. 2021-506231 dated Jun. 28, 2022 with English translation (19 pages).

* cited by examiner

FIG. 3
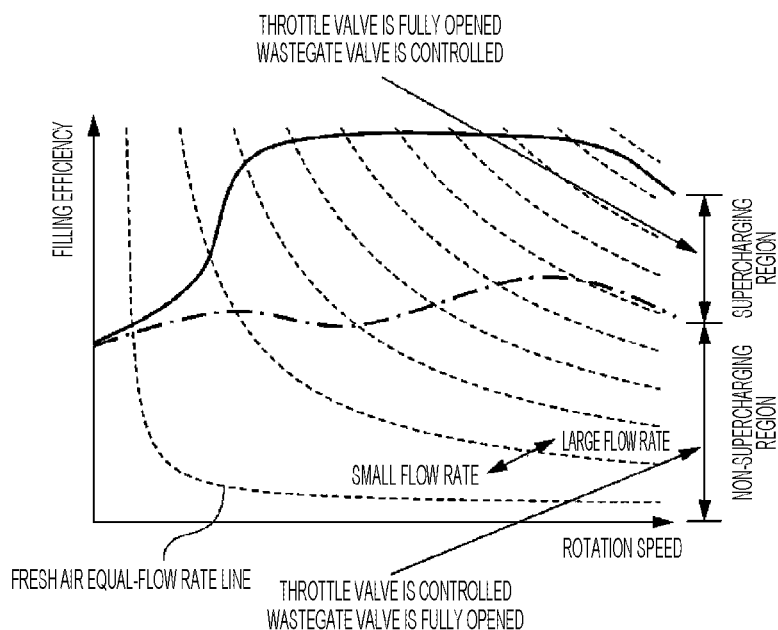
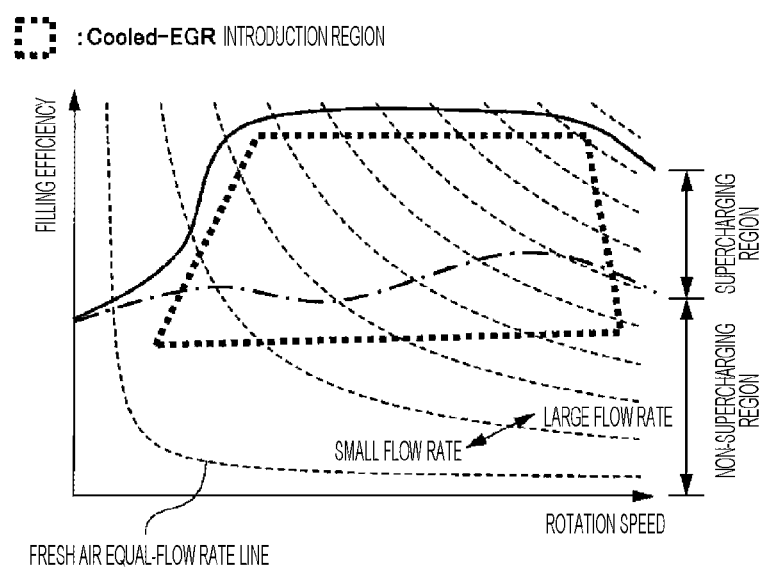

FIG. 4
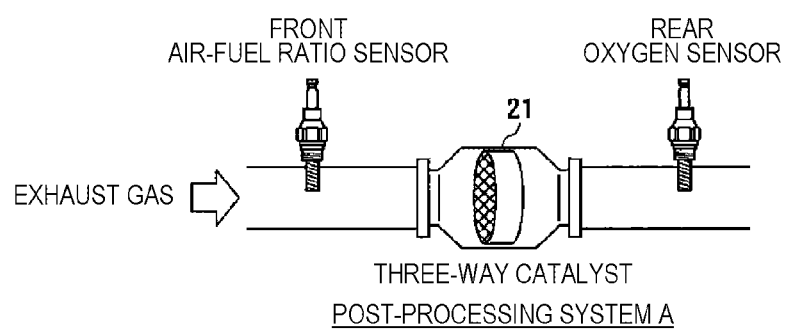
POST-PROCESSING SYSTEM A
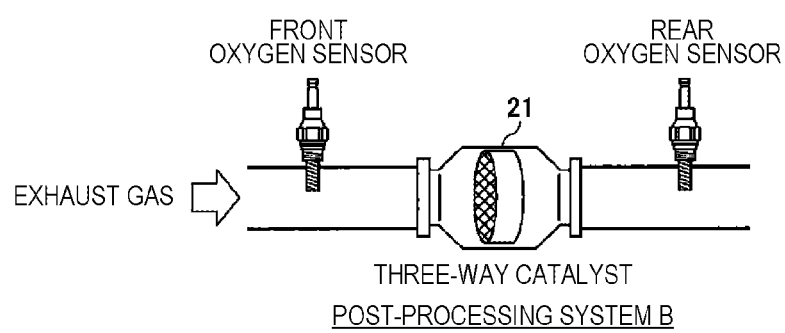
POST-PROCESSING SYSTEM B
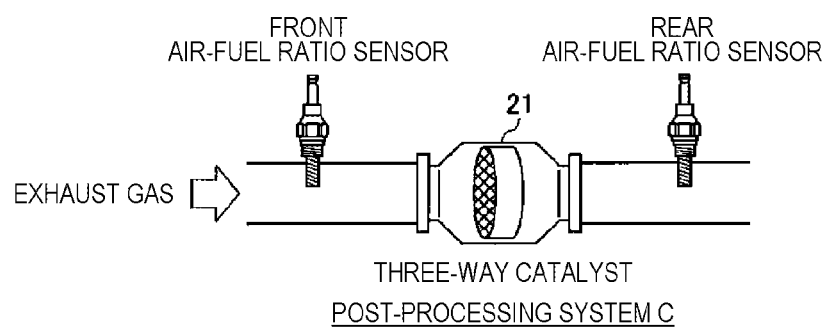
POST-PROCESSING SYSTEM C

INTERNAL COMBUSTION ENGINE CONTROL DEVICE

TECHNICAL FIELD

The present invention relates to an internal combustion engine control device that controls an internal combustion engine.

BACKGROUND ART

Conventionally, there has been known a control technique in which an oxygen storage state in a three-way catalyst is grasped by a three-way catalyst provided in an exhaust pipe of an internal combustion engine and exhaust gas sensors assembled on the upstream and downstream sides of the three-way catalyst, and an air-fuel ratio of an air-fuel mixture is corrected according to a result thereof. In this control technique, a rich correction of the air-fuel ratio is determined on the basis of the oxygen storage state captured by the time integration of the amount of air taken into the engine and the product of the air-fuel ratio of the exhaust gas and the difference value between the theoretical air-fuel ratio. Further, feedback correction of the air-fuel ratio control is performed by detecting the presence or absence of oxygen released on the downstream side of the three-way catalyst by the exhaust gas sensor assembled on the downstream side of the three-way catalyst (for example, PTL 1).

CITATION LIST

Patent Literature

PTL 1: JP 2011-174426 A

SUMMARY OF INVENTION

Technical Problem

Incidentally, there is a tendency that the frequency of motoring operation accompanied by fuel cut and engine stop due to idling stop increases due to the demand for reduction in fuel consumption of the internal combustion engine. Therefore, there is a problem that the oxygen storage state and temperature in the three-way catalyst cannot be accurately grasped, the purification efficiency of the three-way catalyst is deteriorated, and emission performance is deteriorated.

In the method described in PTL 1 in which the presence or absence of oxygen released on the downstream side of the three-way catalyst is detected using an exhaust gas sensor and feedback correction of the air-fuel ratio control is performed, the oxygen storage state of the catalyst reaches the lower limit value or the upper limit value of the target control range at the time when the presence or absence of oxygen is detected. Therefore, there is a problem that the catalyst purification efficiency cannot be kept high, and emission performance deteriorates.

In addition, there is a method in which the amount of oxygen stored in the catalyst during the motoring operation accompanied by fuel cut is estimated at the timing when the oxygen sensor output on the downstream side of the catalyst changes, and rich correction is performed at the time of restarting the firing operation on the basis of the fuel increase period according to the amount of oxygen. In this method, there is a problem that a temperature state of the catalyst and a transient change in an exhaust gas flow rate cannot be considered, an appropriate rich correction cannot be performed, and emission performance deteriorates.

The present invention has been made in view of the above circumstances, and an object thereof is to keep catalyst purification efficiency high and to prevent deterioration of emission performance.

Solution to Problem

In order to solve the above problems, an internal combustion engine control device according to an aspect of the present invention controls an internal combustion engine including a catalyst disposed in an exhaust pipe, a first exhaust gas sensor disposed on an upstream side of the catalyst, and a second exhaust gas sensor disposed on a downstream side of the catalyst. The internal combustion engine control device includes an oxygen storage ratio calculation unit that calculates an oxygen storage ratio of the catalyst based on a catalytic reaction model having at least a detection value of the first exhaust gas sensor as an input, a statistical model calculation unit that predicts a catalyst downstream exhaust gas concentration by using a statistical model having the oxygen storage ratio as an input and the catalyst downstream exhaust gas concentration as an output, and an air-fuel ratio correction amount calculation unit that calculates an air-fuel ratio correction amount of an air-fuel mixture of the internal combustion engine based on a future catalyst downstream exhaust gas concentration calculated by the statistical model calculation unit.

Advantageous Effects of Invention

According to at least one aspect of the present invention, it is possible to keep catalyst purification efficiency high and prevent deterioration of emission performance.

Objects, configurations, and effects besides the above description will be apparent through the explanation on the following embodiments.

BRIEF DESCRIPTION OF DRAWINGS

FIG. 3 is a diagram for explaining a method of controlling a throttle valve and a wastegate valve and an operation area for introducing EGR in an operation area defined by a rotational speed and filling efficiency of an internal combustion engine.

FIG. 4 is a diagram for explaining a configuration of a post-processing system for purifying exhaust gas of the internal combustion engine.

DESCRIPTION OF EMBODIMENTS

Figure 1:
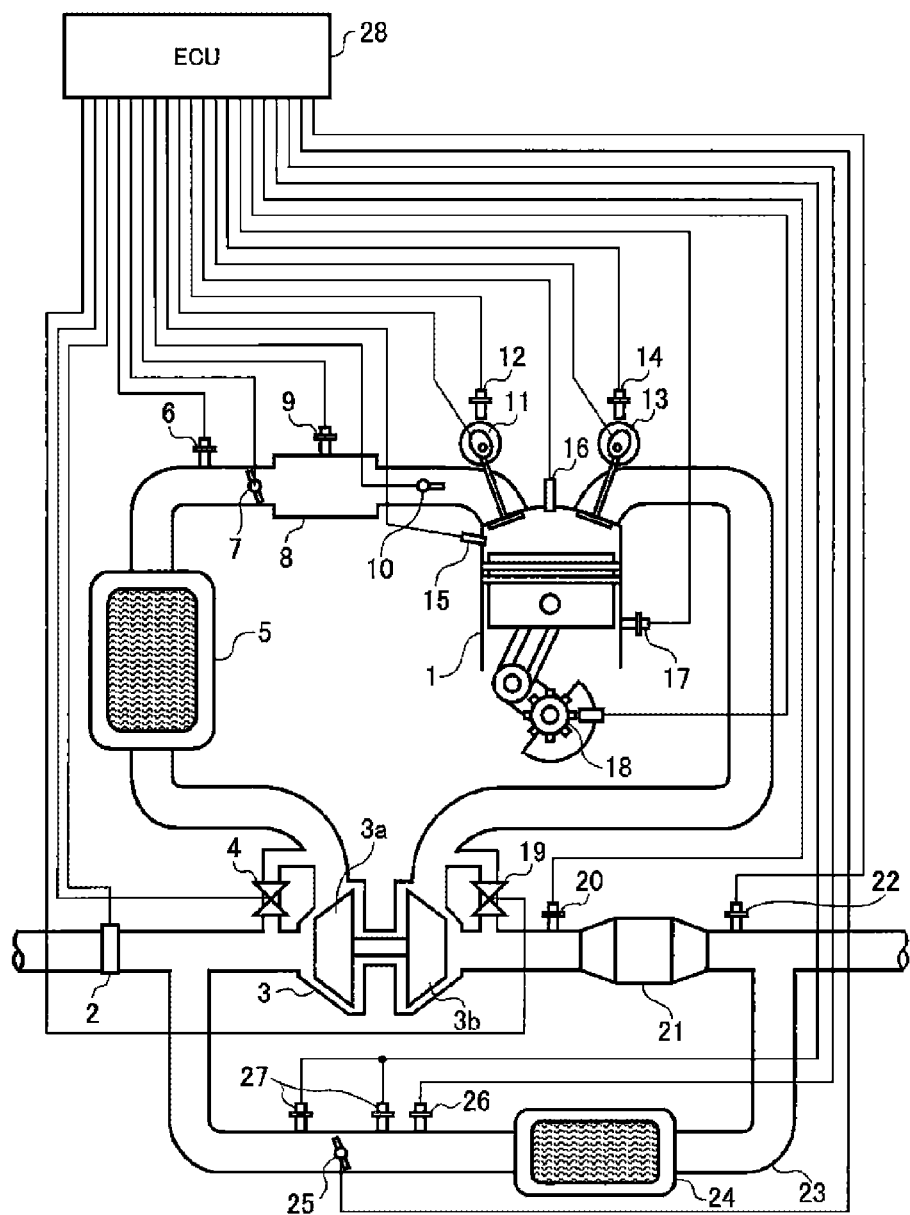
FIG. 1 is a schematic configuration diagram of an entire system to be controlled by an internal combustion engine control device according to an embodiment of the present invention.

Hereinafter, examples of modes for carrying out the present invention (hereinafter, described as "embodiment") will be described with reference to the accompanying drawings. In the present specification and the accompanying drawings, components having substantially the same function or configuration are denoted by the same reference numerals, and redundant description is omitted.

1. Embodiment

[Schematic Configuration of Engine System]

First, a configuration example of an entire engine system to be controlled by an internal combustion engine control device according to an embodiment of the present invention will be described.

FIG. 1 is a schematic configuration diagram of an entire engine system to be controlled by an internal combustion engine control device according to an embodiment of the present invention. The engine system includes an internal combustion engine 1, a flow rate sensor 2, a turbocharger 3, an air bypass valve 4, an intercooler 5, a supercharging temperature sensor 6, a throttle valve 7, an intake manifold 8, a supercharging pressure sensor 9, a flow enhancing valve 10, an intake valve 11, an exhaust valve 13, a fuel injection valve 15, an ignition plug 16, a knock sensor 17, and a crank angle sensor 18. The engine system further includes a wastegate valve 19, an air-fuel ratio sensor 20, an exhaust purification catalyst 21, an oxygen sensor 22, an exhaust gas recirculation (EGR) pipe 23, an EGR cooler 24, an EGR valve 25, a temperature sensor 26, a differential pressure sensor 27, and an electronic control unit (ECU) 28.

An intake flow path and an exhaust flow path communicate with each other via the internal combustion engine 1. The flow rate sensor 2 and an intake temperature sensor (not illustrated) built in the flow rate sensor 2 are assembled to the intake flow path. The turbocharger 3 includes a compressor 3a and a turbine 3b. The compressor 3a is connected to the intake flow path, and the turbine 3b is connected to the exhaust flow path. The turbine 3b of the turbocharger 3 converts the energy of the exhaust gas from the internal combustion engine 1 into the rotational energy of turbine blades. The compressor 3a of the turbocharger 3 compresses the intake air flowing in from the intake flow path by rotation of compressor blades connected to the turbine blades.

The intercooler 5 is provided on the downstream side of the compressor 3a of the turbocharger 3, and cools the intake air temperature of the intake air that has been adiabatically compressed and increased by the compressor 3a. The supercharging temperature sensor 6 is assembled on the downstream side of the intercooler 5 and measures the temperature (supercharging temperature) of the intake air cooled by the intercooler 5.

The throttle valve 7 is provided on the downstream side of the intercooler 5, and narrows the intake flow path to control an intake air amount flowing into a cylinder of the internal combustion engine 1. The throttle valve 7 is configured by an electronically controlled butterfly valve capable of controlling a valve opening independently of an accelerator pedal depression amount by a driver. The intake manifold 8 to which the supercharging pressure sensor 9 is assembled communicates with the downstream side of the throttle valve 7.

Note that the intake manifold 8 provided on the downstream side of the throttle valve 7 and the intercooler 5 may be integrated. In this case, since the volume from the on the downstream side of the compressor 3a to the cylinder can be reduced, it is possible to improve the responsiveness and controllability of acceleration/deceleration.

The flow enhancing valve 10 is disposed on the downstream side of the intake manifold 8, and enhances the turbulence of the flow inside the cylinder by generating a drift in the intake air sucked into the cylinder. When the exhaust gas recirculation combustion described later is performed, the turbulent flow combustion is promoted and stabilized by closing a flow enhancing valve (not illustrated).

The internal combustion engine 1 is provided with an intake valve 11 and an exhaust valve 13. Each of the intake valve 11 and the exhaust valve 13 has a variable valve mechanism for continuously changing a phase of valve opening and closing. An intake valve position sensor 12 and an exhaust valve position sensor 14 for detecting the on-off phase of the valve are respectively assembled to the variable valve mechanisms of the intake valve 11 and the exhaust valve 13. A cylinder of the internal combustion engine 1 includes a direct fuel injection valve 15 that directly injects fuel into the cylinder. The fuel injection valve 15 may be of a port injection type that injects fuel into the intake port.

In the cylinder of the internal combustion engine 1, the ignition plug 16 that exposes an electrode portion in the cylinder and ignites a combustible air-fuel mixture by a spark is assembled. The knock sensor 17 is provided in the cylinder block, and detects the presence or absence of knock by detecting cylinder block vibration caused by combustion pressure vibration generated in the combustion chamber. The crank angle sensor 18 is assembled to a crankshaft, and outputs a signal corresponding to a rotation angle of the crankshaft to the ECU 28 described later as a signal indicating a rotation speed.

The air-fuel ratio sensor 20 is provided on the downstream side of the turbine 3b of the turbocharger 3, and outputs a signal indicating the detected exhaust gas composition, that is, the air-fuel ratio to the ECU 28. The exhaust purification catalyst 21 is, for example, a three-way catalyst, is provided on the downstream side of the air-fuel ratio sensor 20, and purifies harmful exhaust gas components such as carbon monoxide, nitrogen compounds, and unburned hydrocarbon in the exhaust gas by a catalytic reaction. In general, platinum and rhodium, or a mixture of platinum and rhodium and palladium are used as the catalyst substance. The oxygen sensor 22 is provided on the downstream side of the exhaust purification catalyst 21, and detects the presence or absence of oxygen contained in the exhaust gas after purification by the exhaust purification catalyst 21. Hereinafter, the exhaust purification catalyst 21 may be abbreviated as a "catalyst 21".

The turbocharger 3 includes the air bypass valve 4 and the wastegate valve 19. The air bypass valve 4 is disposed on a bypass flow path connecting the upstream and the on the downstream side of the compressor 3a in order to prevent the pressure from excessively increasing from the on the downstream side of the compressor 3a to the on the upstream side of the throttle valve 7. When the throttle valve 7 is rapidly closed in the supercharged state, the air bypass valve 4 is opened according to the control of the ECU 28, whereby the compressed intake air on the downstream side of the compressor 3a flows back to the on the upstream side of the compressor 3a through the bypass flow path. As a result, by immediately decreasing the supercharging pressure, a phenomenon called surging can be prevented, and damage of the compressor 3a can be appropriately prevented.

The wastegate valve 19 is disposed on a bypass flow path connecting upstream and on the downstream side of the turbine 3b. The wastegate valve 19 is an electric valve whose valve opening degree can be freely controlled with respect to supercharging pressure by the control of the ECU 28. When the opening degree of the wastegate valve 19 is adjusted by the ECU 28 based on the supercharging pressure detected by the supercharging pressure sensor 9, a part of the exhaust gas passes through the bypass flow path, so that the work given to the turbine 3b by the exhaust gas can be reduced. As a result, the supercharging pressure can be held at the target pressure.

The EGR pipe 23 communicates an exhaust flow path on the downstream side of the exhaust purification catalyst 21 and an intake flow path on the upstream side of the compressor 3a, splits the exhaust gas from the on the downstream side of the exhaust purification catalyst 21, and returns the exhaust gas to the on the upstream side of the compressor 3a. The EGR cooler 24 provided in the EGR pipe 23 cools the exhaust gas. The EGR valve 25 is provided on the downstream side of the EGR cooler 24 and controls the flow rate of the exhaust gas. The EGR pipe 23 is provided with the temperature sensor 26 that detects the temperature of the exhaust gas flowing on the upstream side of the EGR valve 25 and the differential pressure sensor 27 that detects the differential pressure between upstream and on the downstream side of the EGR valve 25.

The ECU 28 is an example of an internal combustion engine control device, and controls each component of the engine system and executes various data processing. The above-described various sensors and various actuators are communicably connected to the ECU 28. The ECU 28 controls the operations of actuators such as the throttle valve 7, the fuel injection valve 15, the intake valve 11, the exhaust valve 13, and the EGR valve 25. In addition, the ECU 28 detects the operating state of the internal combustion engine 1 based on signals input from various sensors, and causes the ignition plug 16 to ignite at a timing determined according to the operating state.

[Hardware Configuration of ECU]

Figure 2:
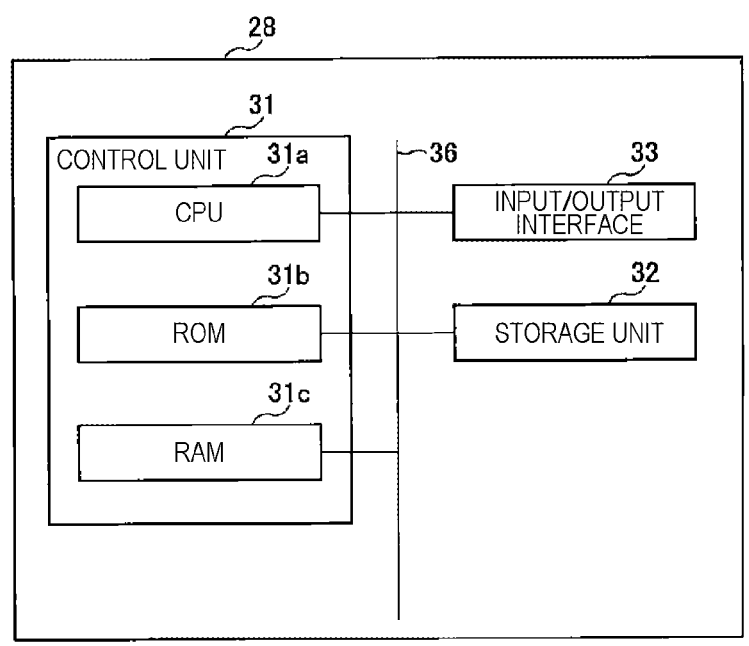
FIG. 2 is a block diagram illustrating a hardware configuration example of an ECU.

FIG. 2 is a block diagram illustrating a hardware configuration example of the ECU 28. The electronic control unit (ECU) 28 includes a control unit 31, a storage unit 32, and an input/output interface 33 connected to one another via a system bus. The control unit 31 includes a central processing unit (CPU) 31a, a read only memory (ROM) 31b, and a random access memory (RAM) 31c. The CPU 31a executes the control program stored in the ROM 31b to implement each function of the ECU 28.

The input/output interface 33 is an interface that communicates signals and data with each sensor and each actuator. The ECU 28 includes an analog/digital (A/D) converter (not illustrated) that processes input/output signals of each sensor, a driver circuit, and the like. The input/output interface 33 may also serve as an A/D converter. Although a central processing unit (CPU) is used as the processor, another processor such as a micro processing unit (MPU) may be used. In addition, the control program may be stored in the storage unit 32 which is an auxiliary storage device including a semiconductor memory or the like.

[Method for Controlling Internal Combustion Engine]

Hereinafter, a control method of the internal combustion engine 1 that realizes a fuel-efficient operation by the throttle system, the wastegate system, and the EGR system included in the internal combustion engine 1 will be described.

FIG. 3 is a diagram for explaining a method of controlling the throttle valve 7 and the wastegate valve 19 and an operation area where EGR (recirculated exhaust gas) is introduced in an operation area defined by the rotation speed and the filling efficiency of the internal combustion engine 1. The filling efficiency is the ratio of the mass of air sucked into the cylinder in one cycle to the mass of air in the standard state corresponding to the cylinder volume. The upper side of FIG. 3 is a graph when cold EGR is not introduced, and the lower side of FIG. 3 is a graph when cold EGR is introduced. In each graph of FIG. 3, the horizontal axis represents the rotation speed, and the vertical axis represents the filling efficiency.

As illustrated in the upper graph of FIG. 3, the operation area of the internal combustion engine 1 is roughly divided into a non-supercharging range and a supercharging range. In the non-supercharging range, the filling efficiency is controlled by the throttle valve 7, and the wastegate valve 19 is fully opened. In the supercharging range, the throttle valve 7 is fully opened, and the supercharging pressure is controlled by the wastegate valve 19 to control the filling efficiency. As described above, by switching the means (throttle valve 7 and wastegate valve 19) for adjusting torque between the non-supercharging range and the supercharging range, the pump loss generated in the internal combustion engine 1 can be reduced, and the fuel-efficient operation can be realized. The thin broken line represents a fresh air equal-flow rate line.

Further, the internal combustion engine 1 described in this embodiment is equipped with an EGR system. In a region (a portion surrounded by a thick broken line in the lower graph of FIG. 3) from a relatively high load condition of the non-supercharging range to the supercharging region of the internal combustion engine 1, the EGR cooled by the EGR cooler 24 is returned to the cylinder, so that the gas sucked into the cylinder is diluted by the EGR as the inert gas, and it is possible to suppress the irregular combustion called knock that is likely to occur under the high load condition. This EGR system is called a cold EGR. Since knocking can be suppressed in this manner, the ignition timing can be appropriately advanced, and a fuel-efficient operation can be realized.

In the engine system of the embodiment described here, the wastegate valve 19 is fully opened in the non-supercharging range. However, the present invention is not limited thereto, and a system of fully closing or holding in an intermediate state can also be adopted. As a result, it is possible to increase the rotational speed of the turbocharger 3 and improve the acceleration performance while reducing the pump loss reduction effect.

[Post-Processing System]

FIG. 4 is a diagram for explaining a configuration of a post-processing system for purifying exhaust gas of the internal combustion engine 1. As the exhaust purification catalyst 21, a three-way catalyst is used. For the purpose of maintaining the purification efficiency of the three-way catalyst at an optimum point, sensors for detecting exhaust gas compositions are provided upstream and on the downstream side of the three-way catalyst, respectively. Three post-processing systems A, B, and C can be configured according to the type of the sensor described above.

In FIG. 4, the upstream side of the catalyst is referred to as "front", and the downstream side of the catalyst is referred to as "rear".

The post-processing system A includes an air-fuel ratio sensor (in the drawing, the front air-fuel ratio sensor) on the upstream side of the catalyst 21 and an oxygen sensor (in the drawing, a rear oxygen sensor) on the downstream side of the catalyst. According to this configuration, the air-fuel ratio of the exhaust gas flowing into the three-way catalyst can be measured, and the presence or absence of oxygen contained in the exhaust gas after catalyst purification can be detected.

The post-processing system B includes an oxygen sensor (in the drawing, the front oxygen sensor) on the upstream side of the catalyst 21 and an oxygen sensor on the downstream side of the catalyst. According to this configuration, the presence or absence of oxygen contained in the exhaust gas flowing into the three-way catalyst can be detected, and the presence or absence of oxygen contained in the exhaust gas after purification of the catalyst can be detected.

The post-processing system C includes an air-fuel ratio sensor on the upstream side of the catalyst 21 and an air-fuel ratio sensor on the downstream side of the catalyst. According to this configuration, the air-fuel ratio of the exhaust gas flowing into the three-way catalyst can be measured, and the air-fuel ratio of the exhaust gas after the catalyst purification can be measured. The post-processing systems A to C described above are selected based on exhaust regulations and cost requirements. The engine system described in this embodiment is based on the post-processing system A.

However, the present invention is not limited to the configuration of the post-processing system A, and it is possible to achieve a similar effect without significantly changing the configuration of the invention by switching the input and output of a control model (see FIG. 14) to be described later as described above.

[Relationship Between Equivalent Ratio of Exhaust Gas and Output of Air-Fuel Ratio Sensor]

Figure 5:
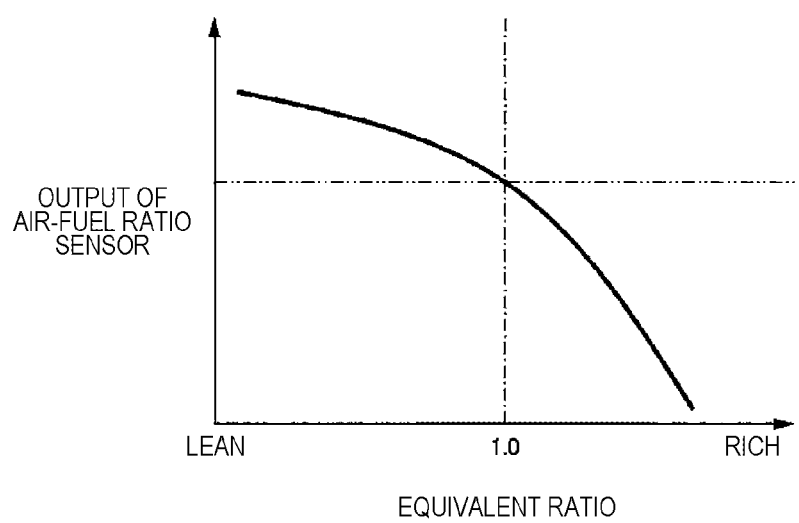
FIG. 5 is a diagram for explaining a relationship between an equivalent ratio of exhaust gas and an output of an air-fuel ratio sensor.

FIG. 5 is a diagram for explaining the relationship between the equivalent ratio (=theoretical air-fuel ratio/air-fuel ratio) of the exhaust gas and the output of the air-fuel ratio sensor. In FIG. 5, the horizontal axis represents the equivalent ratio, and the vertical axis represents the air-fuel ratio sensor output. The air-fuel ratio sensor output tends to decrease as the equivalent ratio increases (as the equivalent ratio becomes richer). The air-fuel ratio sensor is characterized in that the equivalent ratio can be accurately detected in a wide range from the lean state to the rich state for the exhaust gas by acquiring the information indicating the relationship of FIG. 5 in advance.

[Relationship Between Equivalent Ratio of Exhaust Gas and Output of Oxygen Sensor]

Figure 6:
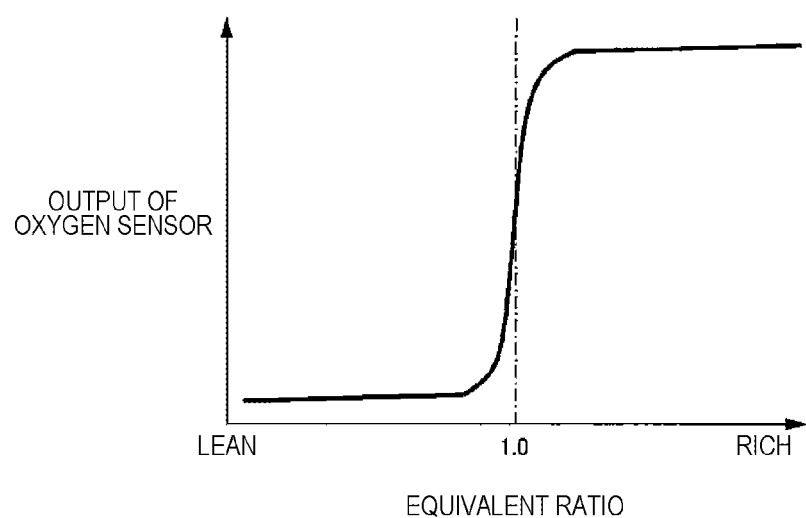
FIG. 6 is a diagram for explaining a relationship between an equivalent ratio of exhaust gas and an output of an oxygen sensor.

FIG. 6 is a diagram for explaining the relationship between the equivalent ratio of the exhaust gas and the output of the oxygen sensor. In FIG. 6, the horizontal axis represents the equivalent ratio, and the vertical axis represents the oxygen sensor output. The oxygen sensor output is represented by an electromotive force associated with a concentration difference between the oxygen concentration contained in the exhaust gas and the oxygen concentration in the air. In the lean condition, almost the minimum electromotive force is shown, and in the rich condition, the maximum electromotive force is shown. Therefore, the output has a characteristic of rapidly changing at the theoretical air-fuel ratio (equivalent ratio 1.0). A characteristic is that the exhaust gas equivalent ratio can be held in the vicinity of the theoretical air-fuel ratio by capturing the change timing of the oxygen sensor output and feeding back the change timing to the air-fuel ratio control.

[Tendency of Chemical Species Concentration of Exhaust Gas with Respect to Equivalent Ratio]

Figure 7:
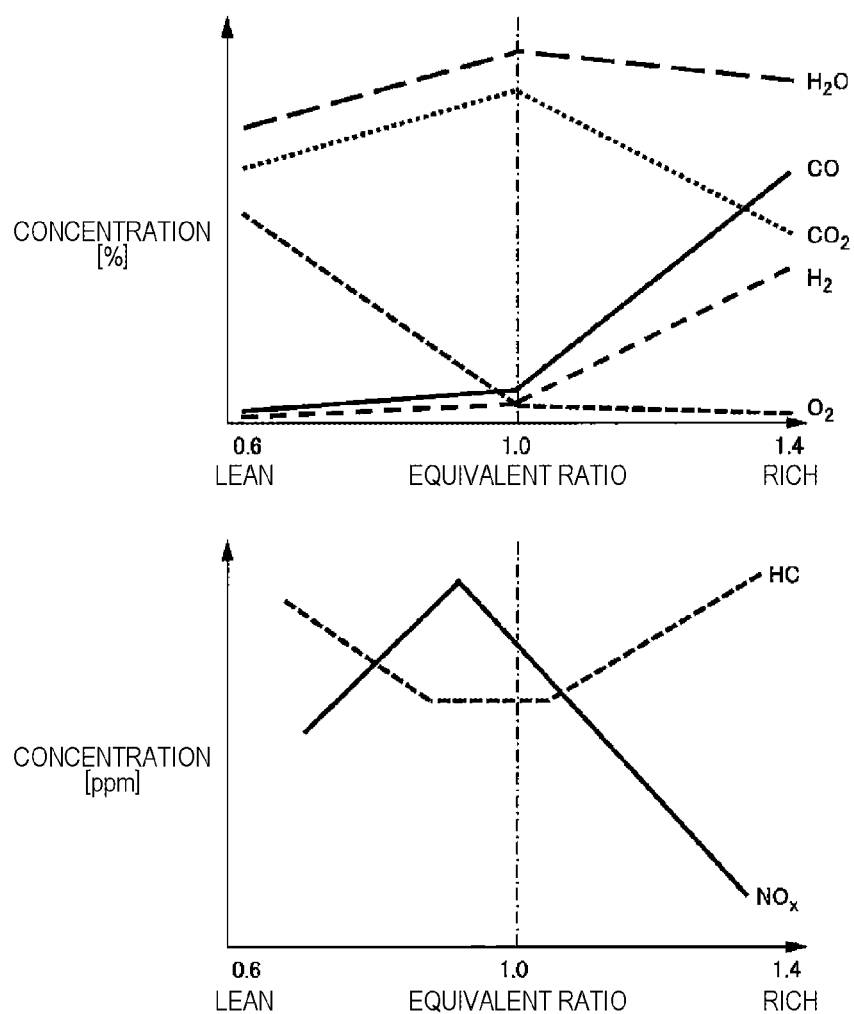
FIG. 7 is a diagram for explaining a tendency of a chemical species concentration of exhaust gas with respect to an equivalent ratio.

FIG. 7 is a diagram for explaining the tendency of the chemical species concentration of the exhaust gas with respect to the equivalent ratio. The horizontal axis of the upper graph of FIG. 7 represents the equivalent ratio, the vertical axis represents the concentration [%], the horizontal axis of the lower graph of FIG. 7 represents the equivalent ratio, and the vertical axis represents the concentration [ppm].

As shown in the upper graph of FIG. 7, the combustion gas composition of the hydrocarbon-based fuel shows a tendency that carbon monoxide (CO) and hydrogen ($H_2$) increase on the rich side and oxygen ($O_2$) increases on the lean side with the theoretical air-fuel ratio (equivalent ratio 1.0) as a boundary (upper graph of FIG. 7).

On the other hand, as shown in the lower graph of FIG. 7, the nitrogen oxide (NOx) shows a maximum value on a slightly lean side of the theoretical air-fuel ratio, and tends to decrease on a lean side and a rich side of the maximum value. Unburned hydrocarbon (HC) is a component that is discharged without reaching combustion, and there is no clear tendency with respect to the equivalent ratio, but when being excessively lean or rich, HC discharged without reaching normal combustion tends to increase.

Further, in a theoretical air-fuel ratio condition in which fuel and air (oxygen) are supplied without excess or deficiency, since a certain amount of CO or NOx is discharged without reaching water ($H_2O$) or carbon dioxide ($CO_2$) in the high-temperature combustion gas, it is necessary to appropriately purify the exhaust gas by the post-processing system.

[Reaction Process of Three-Way Catalyst]

Here, a main reaction process of the three-way catalyst (ceria system) used in the post-processing system will be described.

The reaction process of the three-way catalyst mainly includes an oxidation reaction, an NOx reduction reaction, and an oxygen storage/release reaction. In the oxidation reaction, CO, $H_2$ and HC generated under rich or high temperature conditions react with oxygen to generate harmless $CO_2$ and $H_2O$. The unburned hydrocarbon (HC) contains components such as methane, propane, ethylene, and butane, and the reactions proceed at different rates (Reaction Expressions (1) to (3)). In the NOx reduction reaction, CO and NO are mainly reacted to produce harmless $CO_2$ and $N_2$ (Reaction Expression (4)). In the oxygen storage/release reaction, storage/release of oxygen and each oxidation/reduction reaction of HC, CO, and NO proceed via Ce (cerium) which is a catalyst material (Reaction Expressions (5) to (8)). Each reaction expression is expressed in the form of an elementary reaction expression.

(Oxidation Reaction)

$$CO + O_2 \Rightarrow CO_2 \quad (1)$$

$$H_2 + O_2 \Rightarrow H_2O \quad (2)$$

$$C_nH_m + O_2 \Rightarrow CO_2 + H_2O \quad (3)$$

(NOx Reduction Reaction)

$$CO + NO \Rightarrow CO_2 + N_2 \quad (4)$$

(Oxygen Storage and Release Reaction)

$$CeO_2 + CO \Rightarrow Ce_2O_3 + CO_2 \quad (5)$$

$$C_nH_m + CeO_2 \Rightarrow Ce_2O_3 + CO + H_2O \quad (6)$$

$$Ce_2O_3 + O_2 \Rightarrow CeO_2 \quad (7)$$

$$Ce_2O_3 + NO \Rightarrow CeO_2 + N_2 \quad (8)$$

As described above, harmless $CO_2$ and $H_2O$ are generated by the reaction of cerium dioxide ($CeO_2$) with CO and HC, and harmless $N_2$ is generated by the reaction of dicerium trioxide ($Ce_2O_3$) with NO. At this time, the oxygen storage ratio of the three-way catalyst is defined by the balance between $CeO_2$ and $Ce_2O_3$ generated simultaneously. That is, when all of $Ce_2O_3$ in the catalyst becomes $CeO_2$, a reaction with NO cannot be performed, and NO cannot be purified. As described above, in order to appropriately maintain the purification efficiency of the three-way catalyst, it is necessary to maintain the balance between $CeO_2$ and $Ce_2O_3$, that is, the oxygen storage ratio at a predetermined value. All the above-described reaction processes strongly depend on the catalyst temperature, and it is necessary to appropriately manage the catalyst temperature so that the temperature becomes equal to or higher than the activation temperature early after the engine is started.

In the engine system shown in this embodiment, the ceria-based three-way catalyst is used, but the present invention is not limited thereto. Even in a catalyst using another material exhibiting a similar effect, the same effect can be exhibited without changing the configuration of the invention by adjusting the constant of the control model. In addition, in the catalytic reaction, an aqueous gas shift reaction or the like may be used in addition to the reaction mechanism described above, but these reaction mechanisms can also be handled by adjusting the constant of the control model.

[Purification Efficiency of Three-Way Catalyst with Respect to Exhaust Gas Equivalent Ratio]

Figure 8:
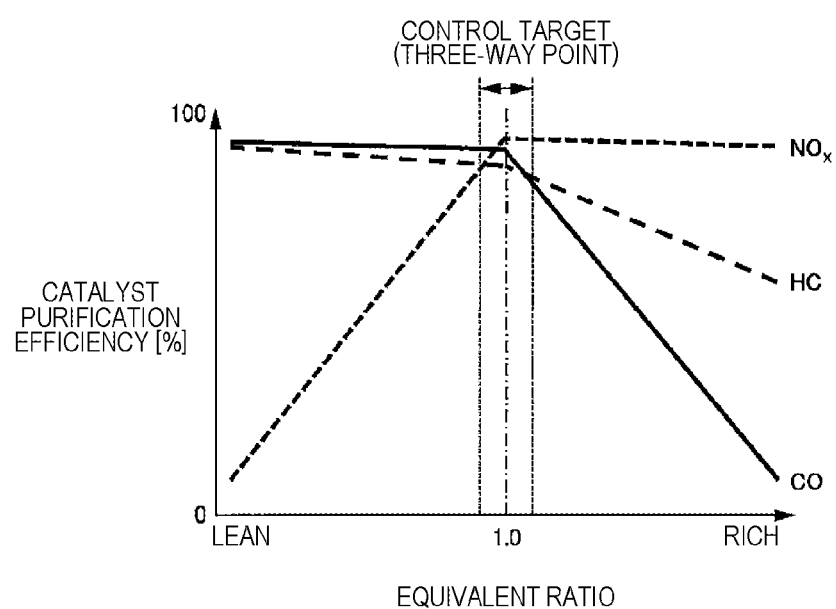
FIG. 8 is a diagram for explaining a tendency of the purification efficiency of a three-way catalyst with respect to the exhaust gas equivalent ratio at a catalyst activation temperature or higher.

FIG. 8 is a diagram for explaining the tendency of the purification efficiency of the three-way catalyst with respect to the exhaust gas equivalent ratio at the catalyst activation temperature or higher. In FIG. 8, the horizontal axis represents the equivalent ratio, and the vertical axis represents the catalyst purification efficiency [%].

The purification efficiency characteristic of the three-way catalyst changes with a theoretical air-fuel ratio (equivalent ratio 1.0) as a boundary. Under the lean condition, while the purification efficiency of CO and HC is maintained at approximately 90% or more, the purification efficiency of NOx decreases as the equivalent ratio decreases. Under the rich condition, the purification efficiency of HC and CO tends to decrease as the equivalent ratio decreases. In the vicinity of the theoretical air-fuel ratio, the purification efficiency of 90% or more can be achieved for any of NOx, HC, and CO, and this point is referred to as a three-way point. In the three-way catalyst, control is performed to keep the purification efficiency high by keeping the equivalent ratio near the theoretical air-fuel ratio (control target) including the three-way point.

[Variation of Equivalent Ratio and Output of Oxygen Sensor on the Downstream Side of Catalyst]

Figure 9:
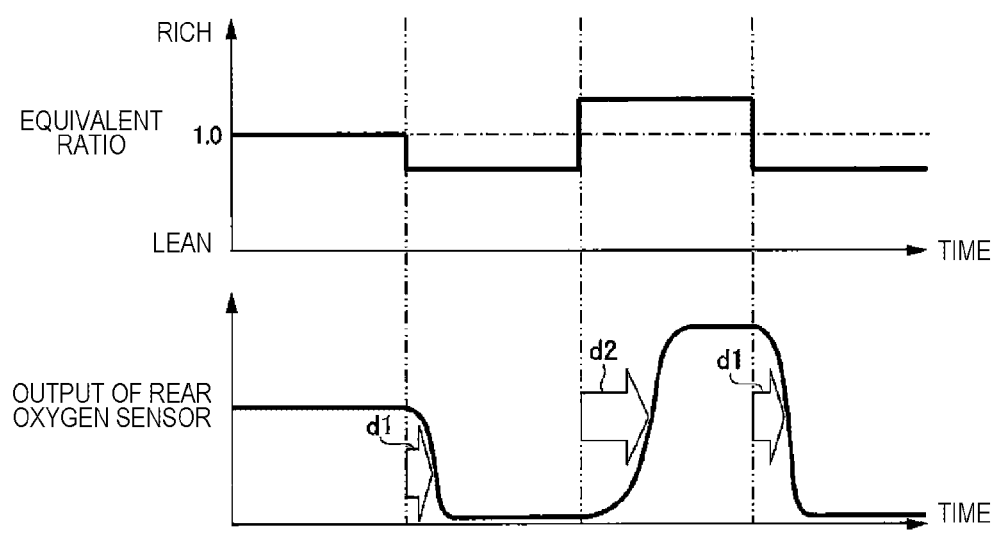
FIG. 9 is a diagram for explaining the output behavior of a rear oxygen sensor installed on the downstream side of the catalyst when the air-fuel ratio is varied stepwise over time to the lean side or the rich side with an equivalent ratio of 1.0 as a center.

FIG. 9 is a diagram for explaining the output behavior of the oxygen sensor 22 installed on the downstream side of the catalyst 21 when the air-fuel ratio is varied stepwise over time to the lean side or the rich side with the equivalent ratio 1.0 as a center. In each graph of FIG. 9, the horizontal axis represents time, and the vertical axis represents an equivalent ratio (upper graph) and a rear oxygen sensor output (lower graph).

Even when the equivalent ratio is set to the theoretical air-fuel ratio, a very small amount of oxygen is discharged on the downstream side of the catalyst, so that the intermediate state is maintained. Then, when the equivalent ratio is changed stepwise over time to the lean side, the rear oxygen sensor output changes to the minimum value side after the delay period d1. On the other hand, when the air-fuel ratio is changed from the lean side to the rich side, the rear oxygen sensor output exhibits hysteresis that changes with a larger delay period d2.

As described above, the characteristic of the oxygen sensor is that the delay time tends to be different between the change from lean to rich and the change from rich to lean. This is because the reaction rates of $CeO_2$ and $Ce_2O_3$ described above are different. Since the reaction rate depends on the catalyst temperature, the hysteresis described above also changes depending on the catalyst temperature.

[Oxygen Sensor Output and NOx Concentration after Fuel Cut Operation]

Figure 10:
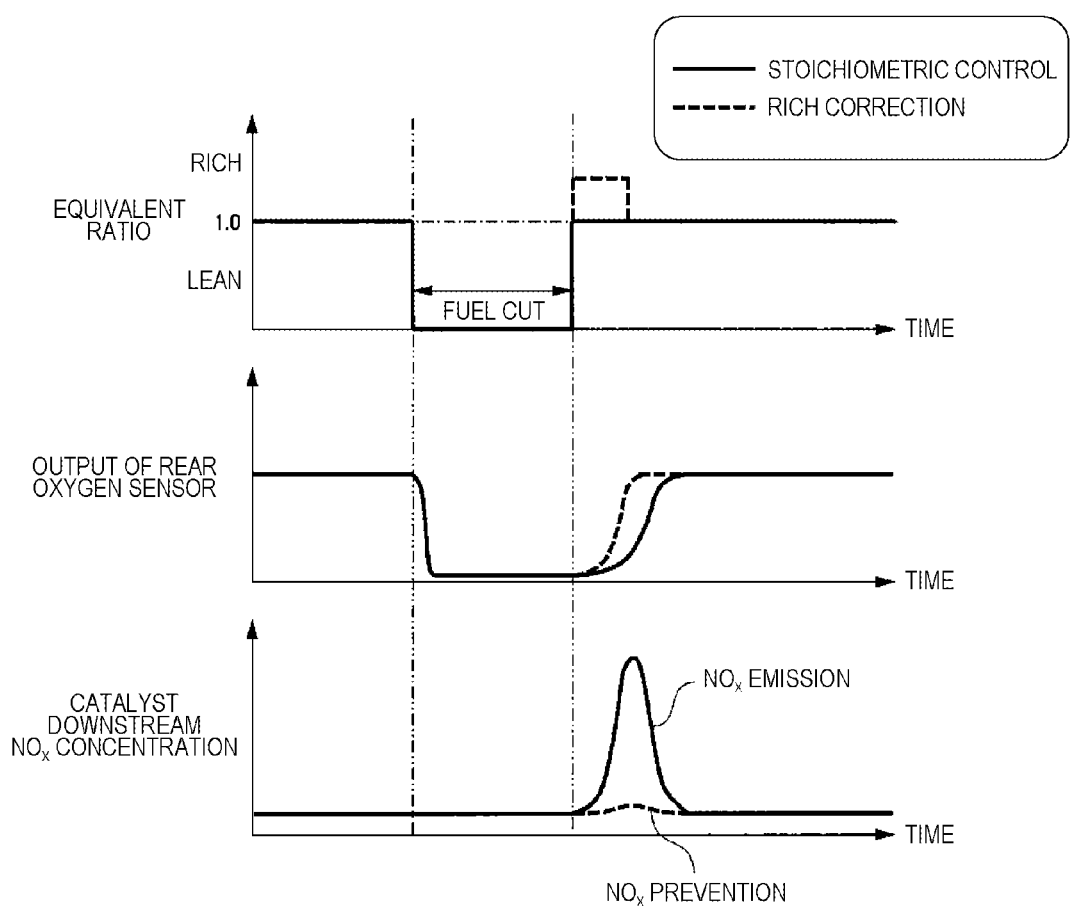
FIG. 10 is a diagram for explaining temporal changes in the rear oxygen sensor output and the NOx concentration on the downstream side of the catalyst when a firing operation is performed again in the theoretical air-fuel ratio state after a motoring operation (fuel cut) period from a state where the control is performed at the theoretical air-fuel ratio.

FIG. 10 is a diagram for explaining temporal changes in the rear oxygen sensor output and the catalyst downstream NOx concentration when the firing operation is performed again in the theoretical air-fuel ratio state after the motoring operation (fuel cut) period from the state where the control is performed at the theoretical air-fuel ratio. In each graph of FIG. 10, the horizontal axis represents time, and the vertical axis represents an equivalent ratio (upper graph), a rear oxygen sensor output (middle graph), and a catalyst downstream NOx concentration (lower graph). In each graph, the solid line indicates the behavior during the stoichiometric control, and the broken line indicates the behavior after the rich correction.

When the fuel cut-off is performed, $O_2$ sucked into the cylinder of the internal combustion engine 1 increases. When the firing operation using the theoretical air-fuel ratio is started again after the fuel cut, the rear oxygen sensor output increases with a delay from the minimum value as indicated by the solid line as described in FIG. 9. Then, in a delay period until the rear oxygen sensor output returns to the maximum value, the catalyst downstream NOx concentration increases in a spike manner, and a large amount of NOx is discharged.

On the other hand, when starting the firing operation again after the fuel cut, if the theoretical air-fuel ratio control is performed after performing the rich correction to change the equivalent ratio indicated by the broken line to the rich side, NOx emission on the downstream side of the catalyst can be prevented. In other words, NOx emission can be prevented by sucking rich gas (large amount of fuel and small amount of $O_2$) into the cylinder of the internal combustion engine 1 before the rear oxygen sensor output changes from the minimum value.

As understood from FIG. 10, since the oxygen sensor 22 detects the oxygen state of the exhaust gas on the downstream side of the catalyst 21, the internal state of the catalyst has already changed to the maximum or minimum state of the oxygen storage state at the time when the oxygen sensor 22 reacts. That is, in the conventional method of performing feedback control after the reaction of the rear oxygen sensor, since the control timing is too late for the catalyst 21, emission deterioration cannot be appropriately prevented. Therefore, in the air-fuel ratio control of the internal combustion engine 1, it can be said that it is necessary to perform rich correction control for an appropriate period in consideration of a catalyst state that cannot be directly observed from the outside.

[Degree of Catalyst Deterioration and Oxygen Storage Capacity]

Figure 11:
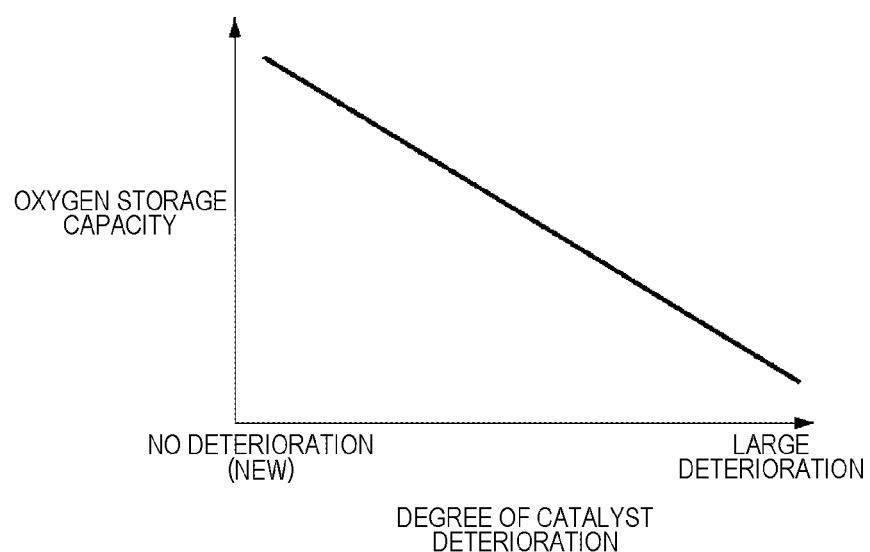
FIG. 11 is a diagram for explaining the relationship between the deterioration degree of the three-way catalyst and the oxygen storage capacity.

FIG. 11 is a diagram for explaining the relationship between the deterioration degree of the three-way catalyst and the oxygen storage capacity. In FIG. 11, the horizontal axis represents the degree of catalyst deterioration, and the vertical axis represents the oxygen storage capacity. The catalyst deterioration refers to a state in which the catalytic action is reduced due to a thermal influence or an influence of poisoning by sulfur contained in the fuel. As shown in FIG. 11, the oxygen storage capacity tends to decrease as the catalyst deterioration progresses. Hereinafter, the influence of the change in oxygen storage capacity on the purification action of the three-way catalyst will be described.

[Oxygen Storage Ratio and Oxygen Sensor Output when Equivalent Ratio is Varied]

Figure 12:
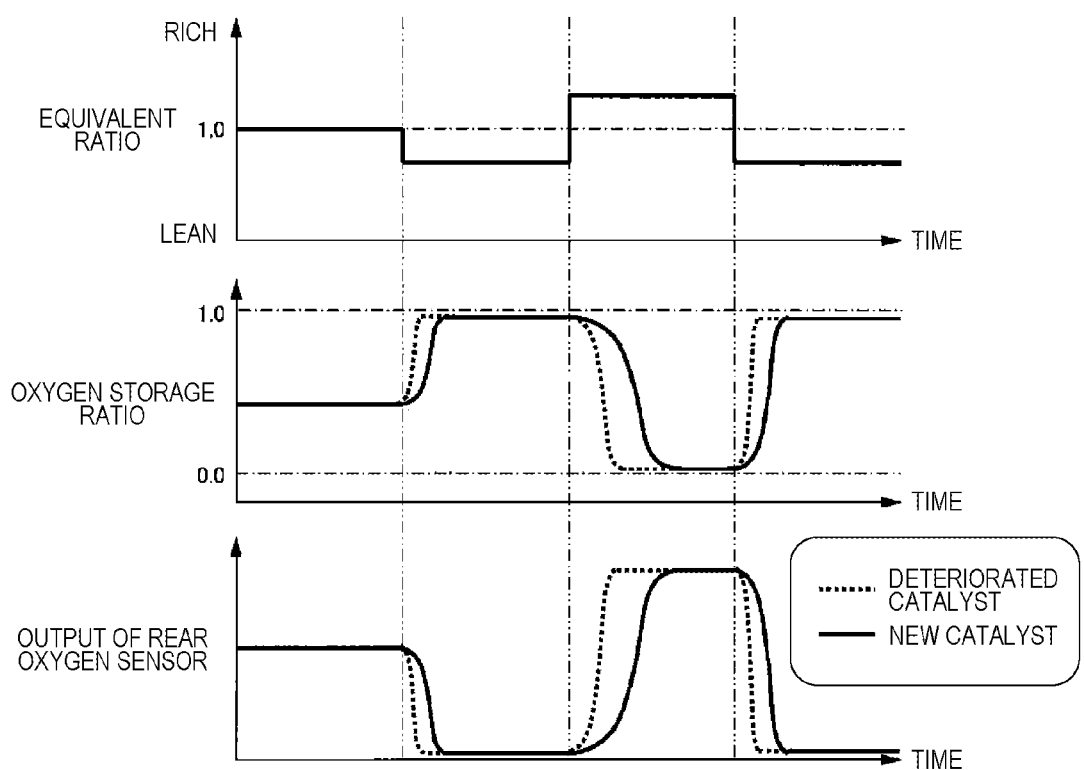
FIG. 12 is a diagram for explaining a comparison result of the output behavior of the rear oxygen sensor installed on the downstream side of the catalyst when the air-fuel ratio is varied stepwise to a lean side or a rich side with an equivalent ratio of 1.0 as a center in the new catalyst and the deterioration catalyst.

FIG. 12 is a diagram for explaining a comparison result of the output behavior of the oxygen sensor 22 installed on the downstream side of the catalyst when the air-fuel ratio is varied stepwise over time to a lean side or a rich side with an equivalent ratio of 1.0 as a center in the new catalyst and the deterioration catalyst. In each graph of FIG. 12, the horizontal axis represents time, and the vertical axis represents an equivalent ratio (upper graph), an oxygen storage ratio (middle graph), and a rear oxygen sensor output (lower graph). In each graph, a solid line indicates the behavior of the deterioration catalyst, and a broken line indicates the behavior of the new catalyst.

In the deterioration catalyst, the delay of the rear oxygen sensor output behavior with respect to the change between the lean and rich air-fuel ratios is reduced as compared with the new catalyst (broken line portion in the lower graph of FIG. 12). This can be explained by the temporal transition of the oxygen storage ratio of the catalyst. That is, since the oxygen storage capacity of the catalyst decreases due to deterioration, and the oxygen storage ratio reaches the maximum value or the minimum value more quickly (solid line portion in the lower graph of FIG. 12), the oxygen release behavior toward the on the downstream side of the catalyst is accelerated, and the delay in the rear oxygen sensor output behavior decreases. Therefore, the rich correction period after recovery from the fuel cut described in FIG. 10 needs to be set in consideration of the deterioration state of the catalyst.

[Relationship Between Oxygen Storage Ratio and NOx Purification Efficiency]

Figure 13:
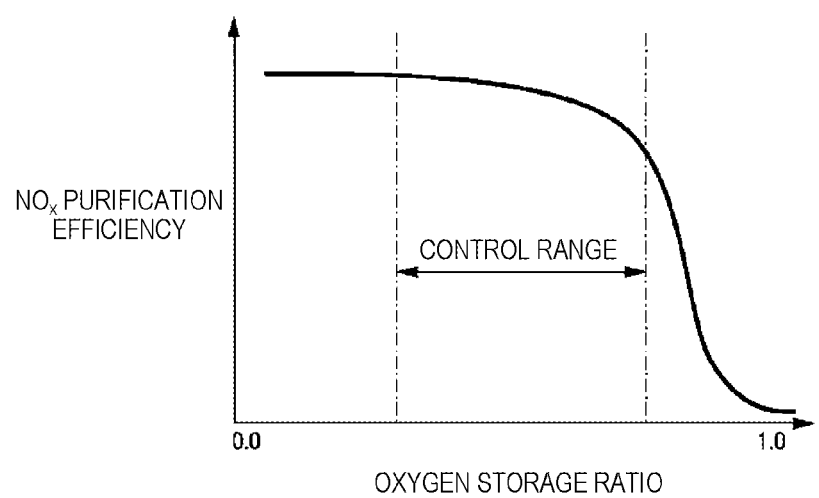
FIG. 13 is a diagram for explaining the relationship between the oxygen storage ratio and the NOx purification efficiency.

FIG. 13 is a diagram for explaining the relationship between the oxygen storage ratio and the NOx purification efficiency. In FIG. 13, the horizontal axis represents the oxygen storage ratio, and the vertical axis represents the NOx purification efficiency. When the oxygen storage amount is 100% relative to the oxygen storage capacity, the oxygen storage ratio is 1.0.

When the oxygen storage ratio exceeds a predetermined value, the NOx purification efficiency is significantly deteriorated. This is because, as described above, $Ce_2O_3$ in the catalyst is important for NOx purification, but when all of $Ce_2O_3$ reacts to change to $CeO_2$, a reaction between $Ce_2O_3$ and NO does not occur, and NO cannot be purified. Therefore, as described in FIG. 8, in order to keep the catalyst purification efficiency high, it is necessary not only to keep the exhaust gas air-fuel ratio at the catalyst inlet at the three-way point but also to appropriately correct and control the exhaust gas air-fuel ratio at the catalyst inlet so that the oxygen storage ratio falls within a predetermined control range.

[Configuration of Control Model]

Figure 14:
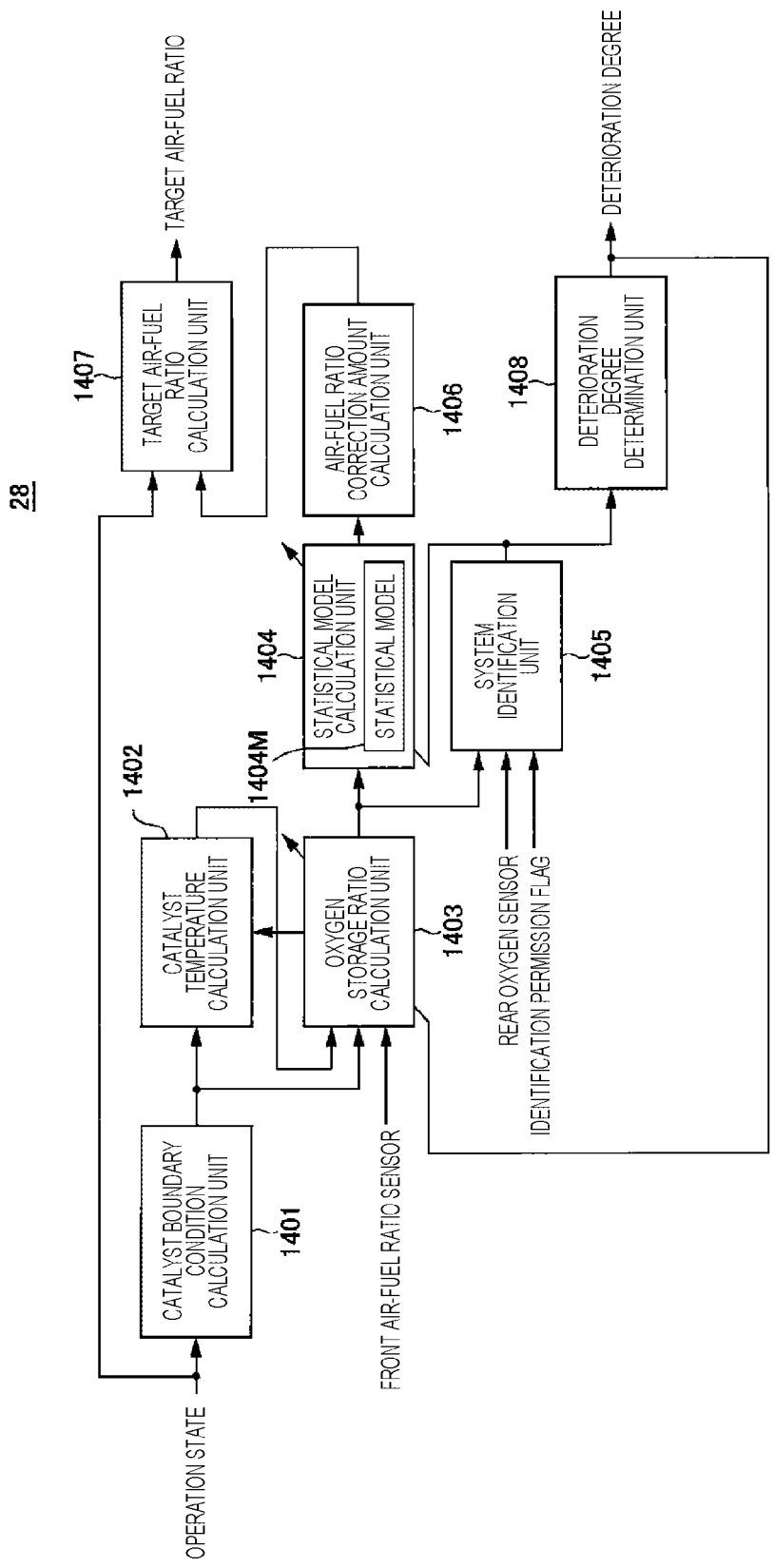
FIG. 14 is a block diagram illustrating the function of a control model (ECU) that corrects and controls an air-fuel ratio in consideration of a catalyst state.

FIG. 14 is a diagram for explaining a block diagram illustrating a function of a control model for correcting and controlling the air-fuel ratio in consideration of the catalyst state. This control model is realized by the ECU 28. The ECU 28 includes a catalyst boundary condition calculation unit 1401, a catalyst temperature calculation unit 1402, an oxygen storage ratio calculation unit 1403, a statistical model calculation unit 1404, a system identification unit 1405, an air-fuel ratio correction amount calculation unit 1406, a target air-fuel ratio calculation unit 1407, and a deterioration degree determination unit 1408.

The catalyst boundary condition calculation unit 1401 calculates a catalyst boundary condition based on the operating state of the internal combustion engine 1 and the like. The catalyst boundary conditions include a catalyst upstream exhaust gas temperature (hereinafter referred to as "exhaust gas temperature"), a catalyst upstream exhaust gas composition (exhaust gas air-fuel ratio), a catalyst inflow exhaust gas flow rate (hereinafter referred to as "exhaust gas flow rate"), atmospheric conditions (outdoor temperature and atmospheric pressure), and a vehicle speed. The calculation result of the catalyst boundary condition is input to the catalyst temperature calculation unit 1402 and the oxygen storage ratio calculation unit 1403.

The catalyst temperature calculation unit 1402 calculates the catalyst temperature based on the catalyst boundary condition calculated by the catalyst boundary condition calculation unit 1401. By providing the catalyst temperature calculation unit 1402, the influence of the catalyst temperature change important in the catalytic reaction can be reflected in the air-fuel ratio control.

The oxygen storage ratio calculation unit 1403 calculates the oxygen storage ratio based on the catalyst boundary condition, the catalyst temperature, the detection value of the air-fuel ratio sensor 20 (front air-fuel ratio sensor) on the upstream side of the catalyst, and the oxygen storage capacity defined by the catalyst deterioration degree. At this time, the relationship shown in FIG. 11 in which the oxygen storage capacity decreases with respect to the progress of catalyst deterioration is considered. Although it is necessary to consider the above-described reaction mechanism for the calculation of the oxygen storage ratio, on-board calculation as a control model is impossible, and thus a simple reaction mechanism is substituted. A specific model configuration will be described later. The calculation result of the oxygen storage ratio is input to the statistical model calculation unit 1404 and the system identification unit 1405. The model handled by the catalyst temperature calculation unit 1402 and the oxygen storage ratio calculation unit 1403 is a catalytic reaction model and can be said to be a physical model.

As described above, in the internal combustion engine control device (ECU 28) of this embodiment, the catalytic reaction model (oxygen storage ratio calculation unit 1403) receives at least the detection value of the first exhaust gas sensor (for example, the air-fuel ratio sensor 20), the catalyst temperature, and the exhaust gas flow rate on the upstream side of the catalyst 21 in the exhaust pipe as inputs.

The catalytic reaction model (Reaction Expressions (9) to (11)) of this embodiment is defined by at least a reaction rate between oxygen on the upstream side of the catalyst 21, carbon monoxide on the upstream side of the catalyst 21, and a metal (platinum, rhodium, etc.) carried in the catalyst 21.

As described above, by accurately calculating the temporal change of the oxygen storage ratio in consideration of the influence of the exhaust gas flow rate, the catalyst temperature, and the catalyst upstream exhaust gas air-fuel ratio, the air-fuel ratio correction control for maintaining the catalyst purification efficiency high in this embodiment can be realized.

The statistical model calculation unit 1404 calculates a statistical model 1404M having the calculation result of the oxygen storage ratio as an input and the detection value of the oxygen sensor 22 (rear oxygen sensor) on the downstream side of the catalyst 21 as an output. A tuning parameter is set in the statistical model 1404M, and is always updated to the latest state by a system identification algorithm described later. With the statistical model 1404M, the behavior of the future rear oxygen sensor detection value can be predictively calculated.

When an identification permission flag is in the ON state, the system identification unit 1405 updates the tuning parameter set to the statistical model 1404M of the statistical model calculation unit 1404 by the system identification algorithm based on the calculated oxygen storage ratio and the rear oxygen sensor detection value. With the system identification algorithm, the catalyst characteristics and the sensor characteristics that change due to deterioration can be sequentially reflected in the tuning parameter, and the calculation accuracy of the statistical model 1404M can be kept high. The processing result (tuning parameter and the like) of the system identification unit 1405 is input to the deterioration degree determination unit 1408.

The air-fuel ratio correction amount calculation unit 1406 calculates the air-fuel ratio correction amount based on the calculation result of the statistical model 1404M. By predictively calculating the future behavior of the rear oxygen sensor detection value by the statistical model 1404M, the air-fuel ratio correction amount can be calculated before the rear oxygen sensor actually changes. Therefore, as compared with the feedback control based on the conventional rear oxygen sensor detection value, the oxygen storage ratio in the catalyst can be more suitably maintained within a predetermined range.

The target air-fuel ratio calculation unit 1407 corrects the air-fuel ratio determined based on the operating state with the calculation result of the air-fuel ratio correction amount calculated by the air-fuel ratio correction amount calculation unit 1406, and calculates the target air-fuel ratio. The control unit 31 controls the air-fuel ratio based on the target air-fuel ratio calculated by the target air-fuel ratio calculation unit 1407, whereby the catalyst purification efficiency can be held high to improve emission performance, and deterioration of emission performance can be prevented by adapting to characteristic changes such as catalyst deterioration. In FIG. 14, the target air-fuel ratio calculation unit 1407 acquires the operating state and determines the air-fuel ratio, but a calculation unit different from the target air-fuel ratio calculation unit 1407 may determine the air-fuel ratio based on the operating state.

The deterioration degree determination unit 1408 determines the deterioration degree of the catalyst 21 (hereinafter, referred to as "catalyst deterioration degree") based on the processing result of the system identification unit 1405. The calculation result of the catalyst deterioration degree is input to the oxygen storage ratio calculation unit 1403.

[Catalyst Boundary Condition Calculation Unit]

Figure 15:
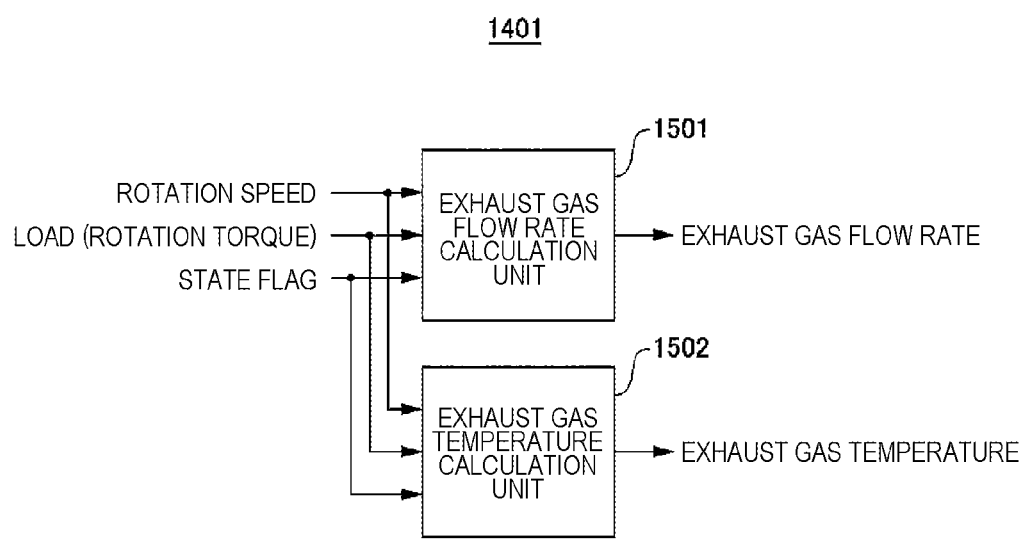
FIG. 15 is a diagram for explaining a calculation content of a catalyst boundary condition in a catalyst boundary condition calculation unit illustrated in FIG. 14.

FIG. 15 is a diagram for explaining calculation contents of the catalyst boundary condition in the catalyst boundary condition calculation unit 1401 illustrated in FIG. 14. The catalyst boundary condition calculation unit 1401 includes an exhaust gas flow rate calculation unit 1501 and an exhaust gas temperature calculation unit 1502.

The exhaust gas flow rate calculation unit 1501 calculates the exhaust gas flow rate based on the rotational speed, the load (rotational torque), and the state flag of the internal combustion engine 1. Similarly, the exhaust gas temperature calculation unit 1502 calculates the exhaust gas temperature based on the rotational speed, the load, and the state flag of the internal combustion engine 1. Note that a temperature sensor may be provided upstream or on the downstream side of the catalyst 21, and the exhaust gas temperature may be detected by the temperature sensor.

The state flag is information for determining a control state such as fuel cut or ignition retard. In the cold start mode, catalyst temperature rise control is performed by ignition retard, intake air increase, and the like. In an internal combustion engine having a sailing stop control function or an internal combustion engine for a hybrid vehicle, a motoring state due to fuel cut frequently occurs, and in this case, air corresponding to atmospheric temperature passes through the catalyst. As described above, since the catalyst upstream temperature is affected by various control states, the catalyst state can be calculated with high accuracy by considering these state transitions.

[Catalyst Temperature Calculation Unit]

Figure 16:
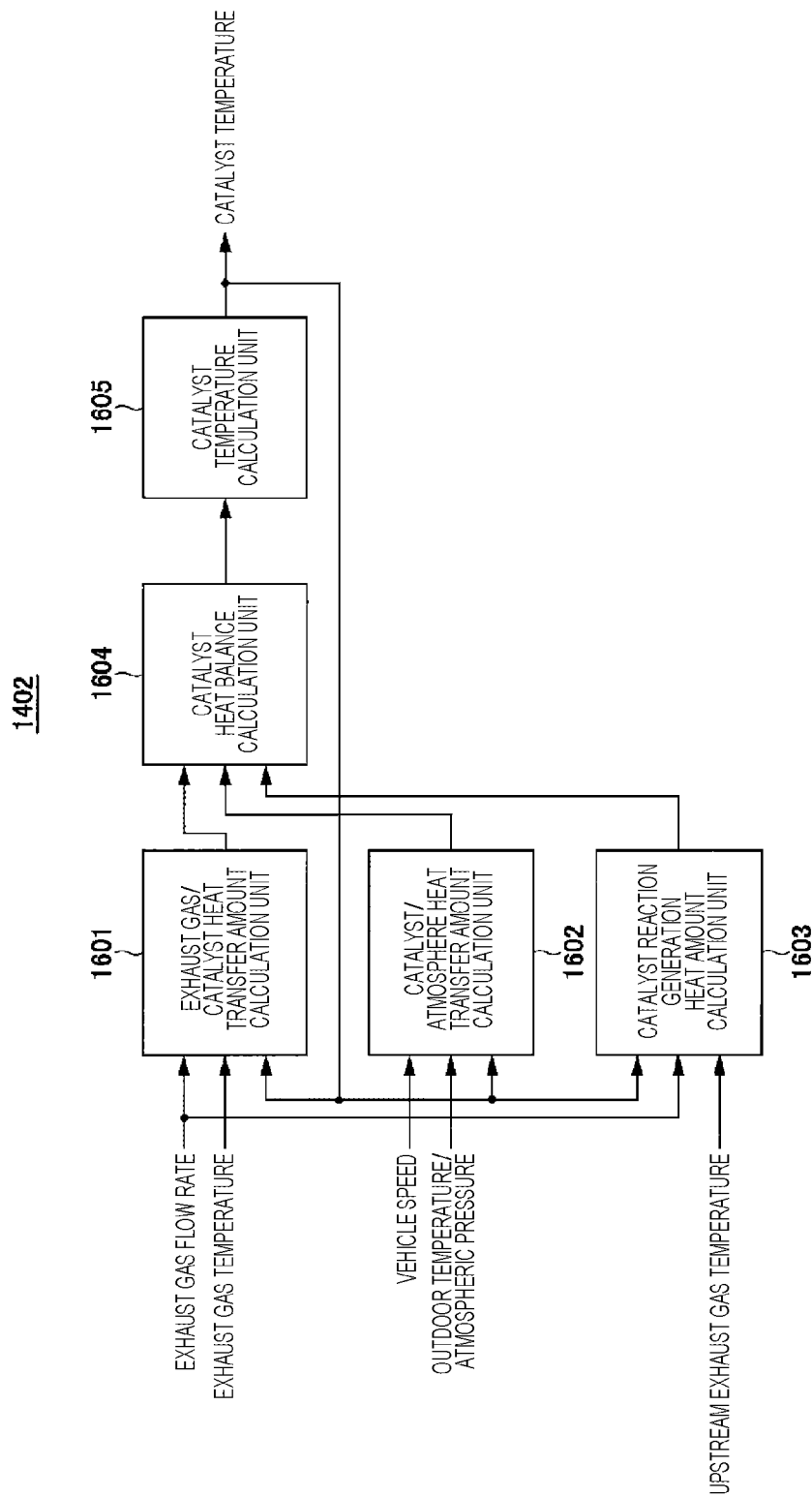
FIG. 16 is a diagram for explaining a calculation content of a catalyst temperature in a catalyst temperature calculation unit shown in FIG. 14.

FIG. 16 is a diagram for explaining calculation contents of the catalyst temperature in the catalyst temperature calculation unit 1402 shown in FIG. 14. The catalyst temperature calculation unit 1402 includes an exhaust gas/catalyst heat transfer amount calculation unit 1601, a catalyst/atmosphere heat transfer amount calculation unit 1602, a catalyst reaction generation heat amount calculation unit 1603, a catalyst heat balance calculation unit 1604, and a catalyst temperature calculation unit 1605.

The exhaust gas/catalyst heat transfer amount calculation unit 1601 calculates the heat transfer amount between the exhaust gas and the catalyst 21 based on the exhaust gas flow rate and the exhaust gas temperature calculated by the catalyst boundary condition calculation unit 1401 and the past catalyst temperature value. The heat transfer amount can be accurately calculated by considering the exhaust gas flow rate and the exhaust gas temperature, which are main factors of the turbulent heat transfer.

The catalyst/atmosphere heat transfer amount calculation unit 1602 calculates the heat transfer amount between the catalyst 21 and the atmosphere based on the vehicle speed, the outdoor temperature and the atmospheric pressure, and the past catalyst temperature value. Regarding heat transfer around the catalyst 21, a forced convection phenomenon is dominant when the vehicle speed is large, and a natural convection phenomenon is dominant when the vehicle speed is small or in a stopped state. By considering such a change in the heat transfer mechanism based on the vehicle speed information, the heat transfer amount around the catalyst 21 can be accurately calculated.

The catalyst reaction generation heat amount calculation unit 1603 calculates the heat amount generated by the catalytic reaction based on the exhaust gas flow rate calculated by the catalyst boundary condition calculation unit 1401, the past catalyst temperature value, and the upstream exhaust gas concentration calculated by an exhaust gas concentration calculation unit 1700. The inside of the catalyst 21 is affected by heat generation due to the oxidation reaction of the unburned gas, endotherm due to the NOx reduction reaction, and the like, and these reaction rates strongly depend on the catalyst temperature. The catalyst reaction generation heat amount calculation unit 1603 can accurately calculate a catalytic reaction generation heat amount in the catalyst 21 in consideration of these.

The catalyst heat balance calculation unit 1604 calculates a balance of each heat transfer amount calculated by the exhaust gas/catalyst heat transfer amount calculation unit 1601 and the catalyst/atmosphere heat transfer amount calculation unit 1602 and a heat amount calculated by the catalyst reaction generation heat amount calculation unit 1603.

The catalyst temperature calculation unit 1605 calculates the temporal change of the catalyst temperature in consideration of catalyst specifications (volume, aperture ratio, surface area, mass, specific heat, and the like) based on the calculation result of the catalyst heat balance by the catalyst heat balance calculation unit 1604. The calculation result of the catalyst temperature is input to the exhaust gas/catalyst heat transfer amount calculation unit 1601 and the catalyst/atmosphere heat transfer amount calculation unit 1602. With such a configuration, even in an engine system in which the starting and stopping of the internal combustion engine 1 are repeated, the catalyst temperature important for estimating the catalyst state can be calculated with high accuracy.

[Oxygen Storage Ratio Calculation Model]

Here, a configuration of an oxygen storage ratio calculation model that is assumed to be operated online (in real time) in the ECU 28 will be described.

The reaction of the three-way catalyst is described by the eight reaction mechanisms of Reaction Expressions (1) to (8) described above. However, it is not realistic to perform the online calculation of the reaction expression from the viewpoint of calculation load, and thus, in the engine system of this embodiment, a simplified reaction model assuming control implementation is used. Among exhaust gas compositions, HC and NOx concentrations are sufficiently smaller than those of other chemical species, and thus only CO and $O_2$ are handled in the simplified reaction model. Then, two Reaction Expressions (9) and (10) involving $CeO_2$ and $Ce_2O_3$ defining the oxygen storage ratio are simultaneously solved. The oxygen storage ratio is defined by the ratio of the number of moles of $CeO_2$ and $Ce_2O_3$ as shown in Reaction Expression (11). Each reaction expression is expressed in the form of an elementary reaction expression.

(Reaction Expressions for Control)

$$CeO_2 + CO \Rightarrow Ce_2O_3 + CO_2 \quad (9)$$

$$Ce_2O_3 + O2 \Rightarrow CeO_2 \quad (10)$$

(Oxygen Storage Ratio)

$$\psi = [CeO_2]/([CeO_2] + [Ce_2O_3]) \quad (11)$$

The reaction rates R1 and R2 of CO and $O_2$ are calculated by the following Expressions (12) and (13), respectively. Expressions (12) and (13) are described in Arrhenius type, and the catalyst temperature, the molar concentration of CO and $O_2$, the oxygen storage ratio $\psi$, and the oxygen storage capacity $\psi$cap are considered. The value of the oxygen storage capacity $\psi$cap may be changed depending on the catalyst deterioration degree. For example, different values are set depending on whether the catalyst is new, not so new, or old. Here, A is a frequency factor, E is activation energy, R is a general gas constant, and Tcat is a catalyst temperature. Since the expression is an exponential function, the calculation load can be reduced by replacing the expression with the table calculation regarding the catalyst temperature Tcat. Data set in the table is set in advance on the basis of an experimental result.

(Reaction Rate)

$$R1 = A1 \cdot \exp(-E1/(R \cdot Tcat)) \cdot [CO] \cdot \psi \cdot \psi cap \quad (12)$$

$$R2 = A2 \cdot \exp(-E2/(R \cdot Tcat)) \cdot [O_2] \cdot (1-\psi) \cdot \psi cap \quad (13)$$

As long as the performance such as the processing speed of the ECU 28 is improved, the oxygen storage ratio is not limited to Reaction Expressions (9) and (10) for CO and $O_2$, and the oxygen storage ratio may be calculated in consideration of other reaction formulas. In this case, it is expected that the calculation result of the oxygen storage ratio approaches an actual value.

[Oxygen Storage Ratio Calculation Unit]

Figure 17:
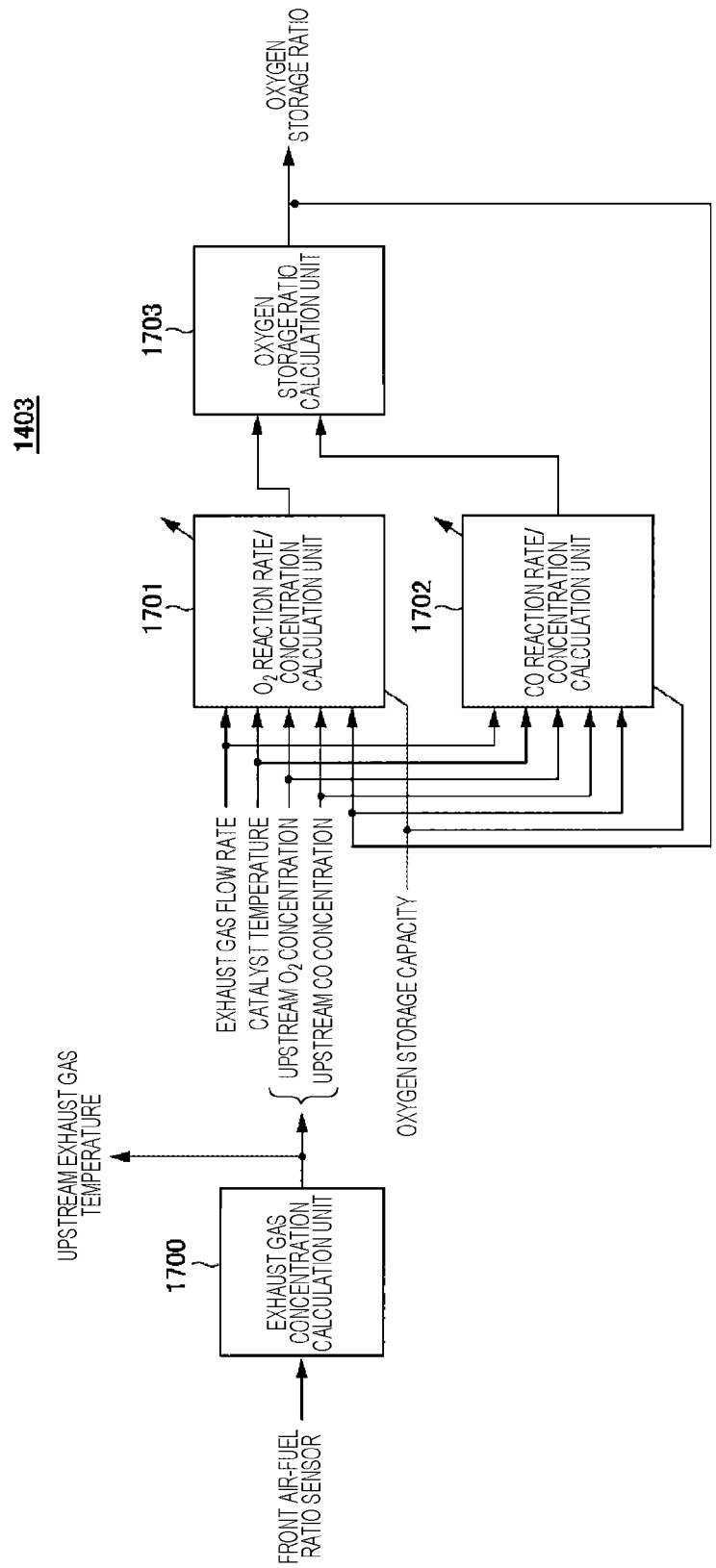
FIG. 17 is a diagram for explaining a calculation content of the oxygen storage ratio in an oxygen storage ratio calculation unit shown in FIG. 14.

FIG. 17 is a diagram for explaining the calculation content of the oxygen storage ratio in the oxygen storage ratio calculation unit 1403 shown in FIG. 14. The oxygen storage ratio calculation unit 1403 includes an exhaust gas concentration calculation unit 1700, an $O_2$ reaction rate/concentration calculation unit 1701, a CO reaction rate/concentration calculation unit 1702, and an oxygen storage ratio transition calculation unit 1703.

The exhaust gas concentration calculation unit 1700 calculates the concentration of the exhaust gas chemical species (upstream exhaust gas concentration) based on the detection value of the air-fuel ratio sensor 20 (front air-fuel ratio sensor) provided on the upstream side of the catalyst 21.

As the upstream exhaust gas concentration, for example, an upstream $O_2$ concentration and an upstream CO concentration are calculated. The catalyst upstream exhaust gas composition can be accurately calculated by performing calculation based on the measured behavior of the actual exhaust gas and the exhaust gas composition information obtained in advance at the development stage. The calculated upstream exhaust gas concentration is output to the catalyst temperature calculation unit 1402. Note that the exhaust gas concentration calculation unit 1700 only needs to have the function as the ECU 28, and is not limited to the inside of the oxygen storage ratio calculation unit 1403.

The $O_2$ reaction rate/concentration calculation unit 1701 calculates the reaction rate and the concentration of $O_2$ based on the exhaust gas flow rate calculated by the catalyst boundary condition calculation unit 1401, the upstream exhaust gas concentration (upstream $O_2$ concentration, upstream CO concentration), the catalyst temperature calculated by the catalyst temperature calculation unit 1402, the past oxygen storage ratio value, and the oxygen storage capacity calculated by the oxygen storage ratio calculation unit 1403.

Similarly, the CO reaction rate/concentration calculation unit 1702 calculates the reaction rate and the concentration of CO based on the exhaust gas flow rate, the upstream exhaust gas concentration (upstream $O_2$ concentration, upstream CO concentration), the catalyst temperature, the past oxygen storage ratio value, and the oxygen storage capacity. As described later, the $O_2$ reaction rate/concentration calculation unit 1701 and the CO reaction rate/concentration calculation unit 1702 are configured to be able to set the oxygen storage capacity according to the catalyst deterioration degree.

Further, the oxygen storage ratio transition calculation unit 1703 calculates the temporal transition of the oxygen storage ratio based on the reaction rate and the concentration of $O_2$ calculated by the $O_2$ reaction rate/concentration calculation unit 1701 and the reaction rate and the concentration of CO calculated by the CO reaction rate/concentration calculation unit 1702.

As described above, the oxygen storage ratio calculation unit (oxygen storage ratio calculation unit 1403) of this embodiment includes the oxygen concentration calculation unit ($O_2$ reaction rate/concentration calculation unit 1701) that calculates the oxygen concentration on the upstream side of the catalyst based on the detection value of the first exhaust gas sensor on the upstream side of the catalyst, and the carbon monoxide concentration calculation unit (CO reaction rate/concentration calculation unit 1702) that calculates the carbon monoxide concentration on the upstream side of the catalyst based on the detection value of the first exhaust gas sensor on the upstream side of the catalyst.

With such a configuration, the temporal transition of the oxygen storage ratio having the hysteresis can be accurately calculated in consideration of the air-fuel ratio change on the upstream side of the catalyst 21 and the catalyst deterioration state.

In this embodiment, the catalyst temperature is included in the input parameter of the catalytic reaction model (oxygen storage ratio calculation unit 1403). As described, as described for the reaction process of the three-way catalyst using Expressions (1) to (8), each reaction process strongly depends on the catalyst temperature. Therefore, the oxygen storage ratio can be accurately calculated by using the catalyst temperature as the input parameter of the catalytic reaction model.

[Modification of Catalyst Temperature Calculation Unit and Oxygen Storage Ratio Calculation Unit]

Figure 18:
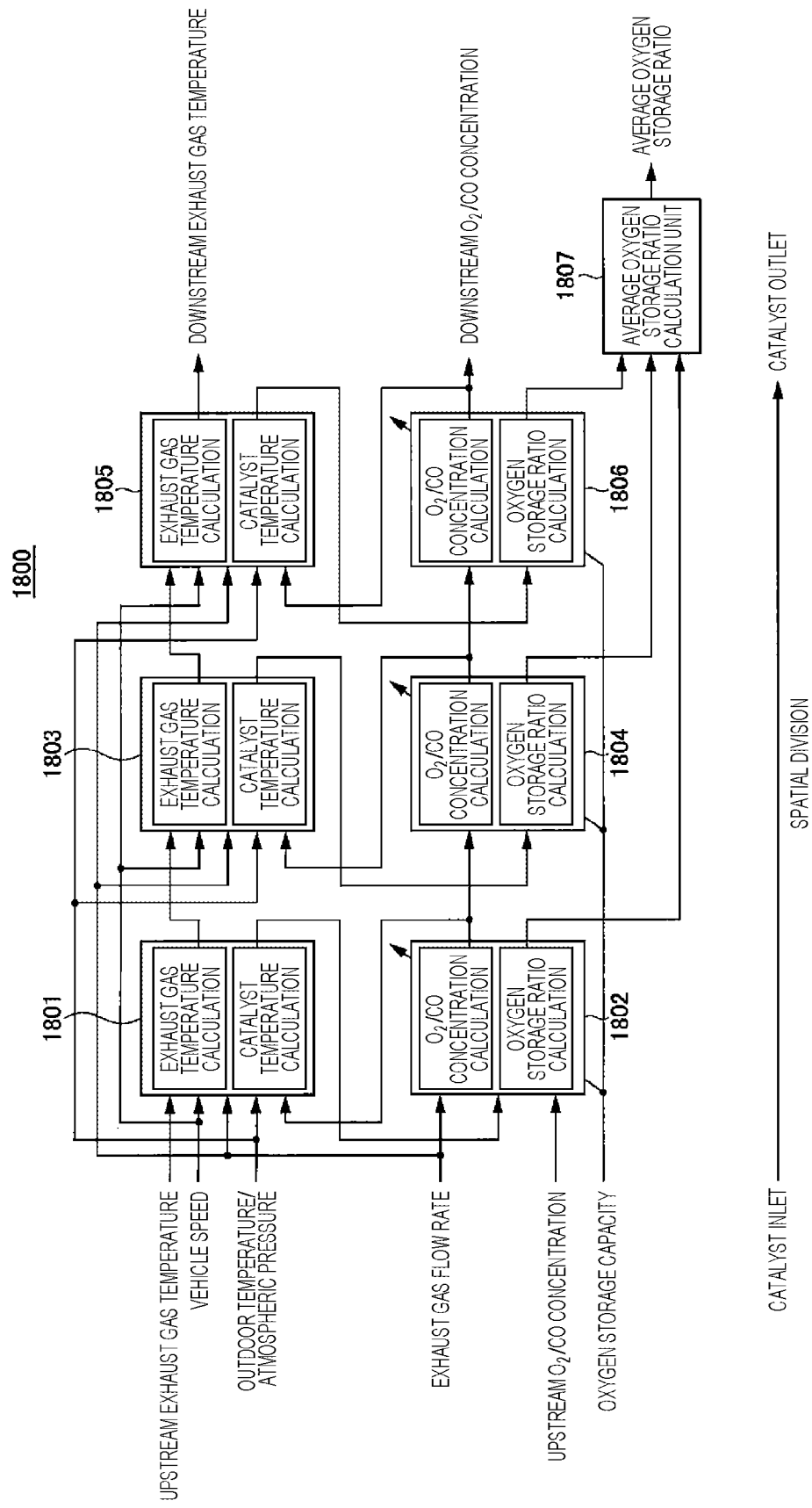
FIG. 18 is a diagram for explaining a model configuration for improving the calculation accuracy of the catalyst temperature and the oxygen storage ratio in the catalyst temperature calculation unit and the oxygen storage ratio calculation unit shown in FIG. 14.

FIG. 18 is a diagram for explaining a model configuration for improving calculation accuracy of the catalyst temperature and the oxygen storage ratio in the catalyst temperature calculation unit 1402 and the oxygen storage ratio calculation unit 1403 illustrated in FIG. 14. A catalyst temperature/oxygen storage ratio calculation unit 1800 illustrated in FIG. 18 includes exhaust gas temperature/catalyst temperature calculation units 1801, 1803, and 1805, $O_2$/CO concentration/oxygen storage ratio calculation units 1802, 1804, and 1806, and an average oxygen storage ratio calculation unit 1807.

The exhaust gas temperature/catalyst temperature calculation units 1801, 1803, and 1805 are models obtained by spatially dividing the catalyst 21. That is, the exhaust gas temperature/catalyst temperature calculation units 1801, 1803, and 1805 are division models when the catalyst 21 is divided into three from the catalyst inlet to the catalyst outlet. The internal functions of the exhaust gas temperature/catalyst temperature calculation units 1801, 1803, and 1805 are the same, and configured by the catalyst temperature calculation unit 1402 illustrated in FIG. 16.

Similarly, the $O_2$/CO concentration/oxygen storage ratio calculation units 1802, 1804, and 1806 are also division models when the catalyst 21 is divided into three from the catalyst inlet to the catalyst outlet. The internal functions of the $O_2$/CO concentration/oxygen storage ratio calculation units 1802, 1804, and 1806 are the same, and are configured by the oxygen storage ratio calculation unit 1403 illustrated in FIG. 17.

The exhaust gas temperature/catalyst temperature calculation unit 1801 at the catalyst inlet outputs the calculation result of the exhaust gas temperature to the exhaust gas temperature/catalyst temperature calculation unit 1803 in the center of the catalyst and outputs the calculation result of the catalyst temperature to the $O_2$/CO concentration/oxygen storage ratio calculation unit 1802 at the catalyst inlet. The $O_2$/CO concentration/oxygen storage ratio calculation unit 1802 outputs the calculation result of the $O_2$/CO concentration to the exhaust gas temperature/catalyst temperature calculation unit 1801 and the $O_2$/CO concentration/oxygen storage ratio calculation unit 1804 in the center of the catalyst, and outputs the calculation result of the oxygen storage ratio to the average oxygen storage ratio calculation unit 1807.

In addition, the exhaust gas temperature/catalyst temperature calculation unit 1803 in the center of the catalyst outputs the calculation result of the exhaust gas temperature to the exhaust gas temperature/catalyst temperature calculation unit 1805 at the catalyst outlet and outputs the calculation result of the catalyst temperature to the $O_2$/CO concentration/oxygen storage ratio calculation unit 1804 in the center of the catalyst. The $O_2$/CO concentration/oxygen storage ratio calculation unit 1804 outputs the calculation result of the $O_2$/CO concentration to the exhaust gas temperature/catalyst temperature calculation unit 1803 and the $O_2$/CO concentration/oxygen storage ratio calculation unit 1806 at the catalyst outlet, and outputs the calculation result of the oxygen storage ratio to the average oxygen storage ratio calculation unit 1807.

Further, the exhaust gas temperature/catalyst temperature calculation unit 1805 at the catalyst outlet calculates the exhaust gas temperature (downstream exhaust gas temperature), and outputs the calculation result of the catalyst temperature to the $O_2$/CO concentration/oxygen storage ratio calculation unit 1806 at the catalyst outlet. The $O_2$/CO concentration/oxygen storage ratio calculation unit 1806 outputs the calculation result of the $O_2$/CO concentration (downstream $O_2$/CO concentration) to the exhaust gas temperature/catalyst temperature calculation unit 1805, and outputs the calculation result of the oxygen storage ratio to the average oxygen storage ratio calculation unit 1807.

The average oxygen storage ratio calculation unit 1807 calculates an average oxygen storage ratio of the entire catalyst 21 from the calculation results of the oxygen storage ratios obtained from the $O_2$/CO concentration/oxygen storage ratio calculation units 1802, 1804, and 1806.

As described above, the inlet to the outlet of the catalyst 21 are spatially divided into a plurality of spaces, and the catalyst temperature and the oxygen storage ratio are calculated for each space, so that it is possible to consider the variation of each value for each space inside the catalyst 21. With such a model configuration, it is possible to consider the time delay behavior and the hysteresis of the catalyst 21 and to improve the calculation accuracy. The division number can be arbitrarily determined in consideration of a balance between calculation load and accuracy.

[Hysteresis of Oxygen Sensor Characteristics]

Figure 19:
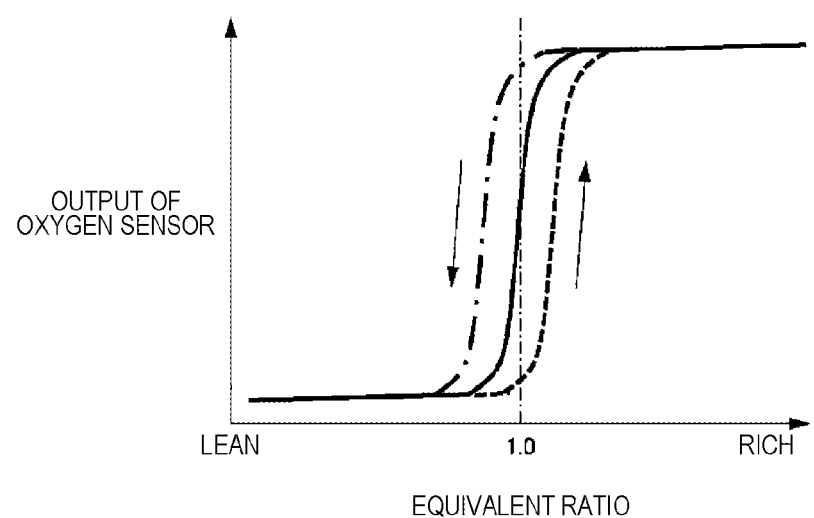
FIG. 19 is a diagram for explaining hysteresis of oxygen sensor characteristics.

FIG. 19 is a diagram for explaining hysteresis of oxygen sensor characteristics. In FIG. 19, the horizontal axis represents the equivalent ratio, and the vertical axis represents the oxygen sensor output.

The static characteristics of the oxygen sensor are as described in FIG. 6. On the other hand, a catalyst material is also used for the oxygen sensor, and has hysteresis due to detection delay. That is, when the gas rapidly changes from the lean state to the rich state, the equivalent ratio (broken line) corresponding to the change timing of the oxygen sensor output shifts to the rich side. When the gas rapidly changes from the rich state to the lean state, the equivalent ratio (one-dot chain line) corresponding to the change timing of the oxygen sensor output shifts to the lean side. Further, the behavior described above is affected by characteristic degradation of the material constituting the oxygen sensor.

Therefore, in the control model of this embodiment, it is desirable to consider not only the deterioration of the catalyst 21 but also the change in the dynamic characteristics of the entire post-processing system including the deterioration of the oxygen sensor 22 on the downstream side of the catalyst 21.

[Statistical Model]

Next, the statistical model 1404M in the statistical model calculation unit 1404 illustrated in FIG. 14 will be described with reference to FIG. 20. In the engine system of this embodiment, the deterioration of the catalyst 21 and the oxygen sensor 22 is treated as a time-varying system, and a method of on-board approximation by sequential system identification of a linear transient model is adopted.

Figure 20:
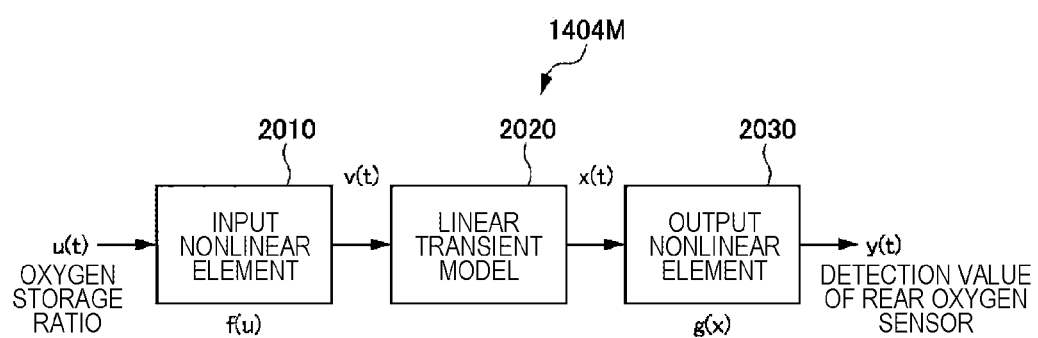
FIG. 20 is a diagram for explaining a statistical model in a statistical model calculation unit illustrated in FIG. 14.

FIG. 20 illustrates a configuration of a nonlinear linear transient model adopted in the statistical model 1404M. The statistical model 1404M, which is a nonlinear linear transient model, includes three elements, and includes an input nonlinear element 2010, a linear transient model 2020, and an output nonlinear element 2030. An oxygen storage ratio is set as an input of the statistical model 1404M, and a rear oxygen sensor detection value (estimated value) is set as an output of the statistical model 1404M.

A function representing a characteristic of the input nonlinear element 2010 is set as f(u), the oxygen storage ratio u(t) is set as an input, and v(t) is set as an output. When a term considering the hysteresis characteristic of the rear oxygen sensor is set to the function f(u) of the input nonlinear element 2010, a model equation of the output v is expressed by Expression (14) as an example.

[Math. 1]

$$v = f(u) = \beta_1 \cdot y \cdot |u| + \beta_2 \cdot u \quad (14)$$

As described above, in the input element (input nonlinear element 2010) of the statistical model 1404M of this embodiment, the hysteresis term reflecting the characteristic in which the response speed of the output is different between when the input increases and when the input decreases is set. With this configuration, the hysteresis (see FIG. 19) of the exhaust gas sensor (for example, the oxygen sensor 22) on the downstream side of the catalyst 21 can be approximated. As described in FIG. 19, the hysteresis of the exhaust gas sensor on the downstream side of the catalyst is affected by, for example, characteristic deterioration of the material constituting the oxygen sensor 22.

In addition, the hysteresis term of this embodiment includes a term ($\beta_1 \cdot y \cdot |u| + \beta_2 \cdot u$) defined by a first input parameter (u) that takes both a positive value and a negative value and a second input parameter (y·|u|) defined by the product of the output parameter (y) that takes a positive value and the absolute value (|u|) of the first input parameter. In this case, the hysteresis of the oxygen sensor 22 can be accurately reflected in the input element of the statistical model 1404M.

In addition, a function representing a characteristic of the output nonlinear element 2030 is g(x), an input from the linear transient model 2020 is x(t), and an output is a rear oxygen sensor detection value y(t). When a sigmoid function for approximating the rear oxygen sensor static characteristic (see FIG. 5) is set to the function g(x) of the output nonlinear element 2030, a model equation of the output y is expressed by Expression (15) as an example.

[Math. 2]

$$y = g(x) = \frac{1}{1 + \exp(-x)} \quad (15)$$

As described above, the output element (output nonlinear element 2030) of the statistical model 1404M of this embodiment is set with a sigmoid function. With this configuration, the static characteristics of the exhaust gas sensor (for example, the oxygen sensor 22) on the downstream side of the catalyst 21 can be approximated.

Note that the sigmoid function used in the output nonlinear element 2030 can be replaced with table calculation in order to reduce the calculation load. In addition, the function g(x) of the output nonlinear element 2030 is not limited to the sigmoid function as long as the output is large when the equivalent ratio is in the rich state and the output is small when the equivalent ratio is in the lean state.

The model equation of the linear transient model 2020 is expressed by Expression (16) as an example. The left side of Expression (16) represents the output side, and the right side represents the input side. [k] corresponds to a future, and [k−1] corresponds to the present (strictly, the past one step before).

[Math. 3]

$$y[k]+a_1 \cdot y[k-1]=b_1 y[k-1] \cdot |u[k-1]|+b_2 \cdot u[k-1] \quad (16)$$

Here, Expression (16) representing the linear transient model 2020 can be transformed as Expression (17). θ on the right side in Expression (17) is a transposed matrix of a matrix of 1 row and 3 columns represented by Expression (18), and φ is a matrix of 1 row and 3 columns represented by Expression (19). a1, b1, and b2 in Expression (18) are arbitrary coefficients (examples of tuning parameters).

[Math. 4]

$$y[k]=\int^T \cdot \phi[k] \quad (17)$$

$$\theta=[a_1,b_1,b_2]^T \quad (18)$$

$$\phi=[-y[k-1], y[k-1] \cdot |u[k-1]|, u[k-1]] \quad (19)$$

An auto-regressive with eXogenous (ARX) model generally used in control is applied to the linear transient model 2020. The order of the ARX model can be selected by a balance between accuracy and calculation load. A tuning parameter is set to the linear transient model 2020, and the tuning parameter is updated online. As a result, the latest system state can be always reflected in the statistical model 1404M.

Since the statistical model 1404M includes such components, it is possible to consider dynamic characteristics of the entire post-processing system and temporal changes thereof.

Note that the configuration of the statistical model used in the engine system of this embodiment is not limited thereto. For example, since the catalyst temperature and the exhaust gas flow rate are influencing factors of the catalytic reaction rate, it is possible to improve the accuracy of the statistical model by adding influencing factors such as the catalyst temperature and the exhaust gas flow rate to the input variables. In addition, the oxygen concentration on the downstream side of the catalyst can be set instead of the oxygen storage ratio. In the post-processing system C (FIG. 4) including the air-fuel ratio sensor on the downstream side of the catalyst, the output nonlinear element 2030 of the statistical model can be omitted, and the air-fuel ratio sensor detection value can be directly set.

[System Identification Algorithm]

Figure 21:
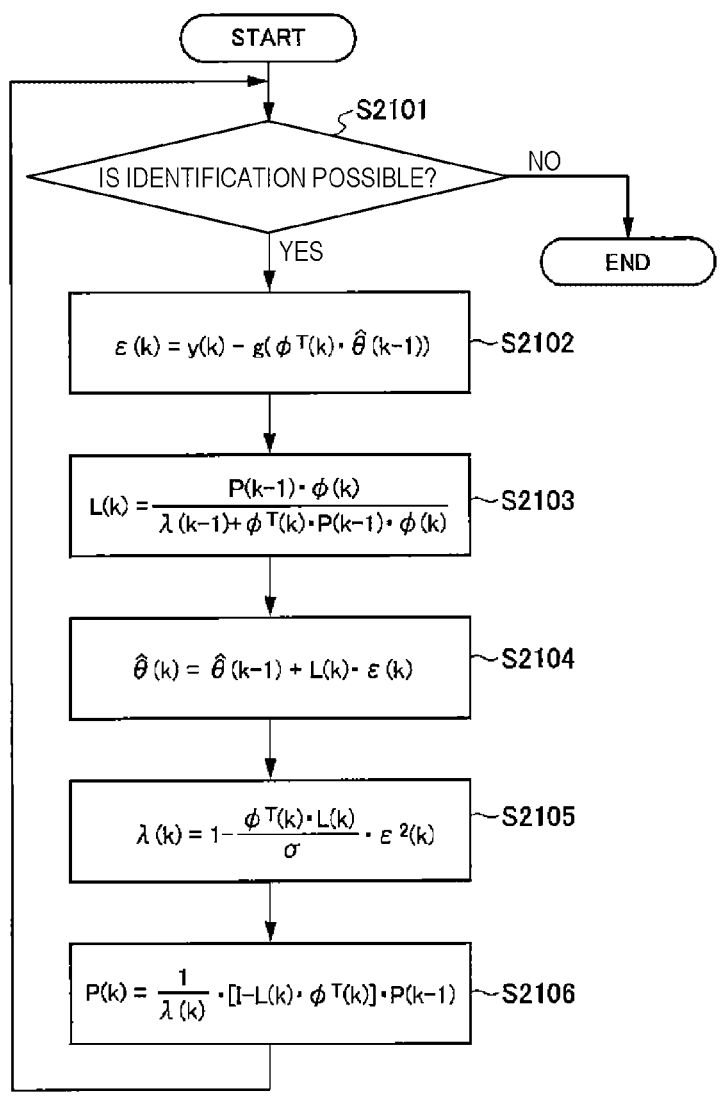
FIG. 21 is a flowchart illustrating an example of a system identification algorithm in a system identification unit illustrated in FIG. 14.

FIG. 21 is a flowchart illustrating an example of a system identification algorithm in the system identification unit 1405 illustrated in FIG. 14. In this embodiment, a successive least squares approximation algorithm with a variable forgetting element is adopted for the successive identification of the tuning parameters of the statistical model 1404M. The forgetting element is to exponentially forget the past history according to the age. By adopting the forgetting element, the influence of the latest state of the engine system can be appropriately considered for the tuning parameter.

First, the system identification unit 1405 determines whether the statistical model 1404M is in a state in which the tuning parameter can be identified (S2101). The control unit 31 of the ECU 28 determines whether the identification is possible based on the operating state of the internal combustion engine 1. The system identification unit 1405 refers to an identification permission flag that is set when identification is possible, and determines that the identification processing is permitted, for example, when the identification permission flag is "1". Here, whether it is the timing for identification may be used as the determination condition. If the system identification unit 1405 determines that identification is impossible (NO in S2101), the processing of this flowchart ends.

Next, when determining that identification is possible (YES in S2101), the system identification unit 1405 calculates Expressions (20) to (24) by the system identification algorithm (S2102 to S2106).

[Math. 5]

$$\varepsilon(k) = y(k) - g(\phi^T(k) \cdot \hat{\theta}(k-1)) \quad (20)$$

[Math. 6]

$$L(k) = \frac{P(k-1) \cdot \phi(k)}{\lambda(k-1) + \phi^T(k) \cdot P(k-1) \cdot \phi(k)} \quad (21)$$

[Math. 7]

$$\hat{\theta}(k) = \hat{\theta}(k-1) + L(k) \cdot \varepsilon(k) \quad (22)$$

[Math. 8]

$$\lambda(k) = 1 - \frac{\phi^T(k) \cdot L(k)}{\sigma} \cdot \varepsilon^2(k) \quad (23)$$

[Math. 9]

$$P(k) = \frac{1}{\lambda(k)} \cdot [I - L(k) \cdot \phi^T(k)] \cdot P(k-1) \quad (24)$$

ε(k) in Expression (20) in Step S2102 represents a difference between the current measured value of the oxygen sensor 22 and the estimated value (prediction value) of the rear oxygen sensor. Equations (21) to (24) in Steps S2103 to S2106 are calculated based on the value of θ (k). θ^(k) (^ is on θ in the drawing) of Expression (22) in Step S2104 is a parameter vector of the statistical model 1404M, and means an instantaneous value that changes sequentially. λ(k) in Expression (23) in Step S2105 represents a variable forgetting coefficient. Further, σ in Expression (23) is a parameter for adjusting the degree of variation of the variable forgetting coefficient λ(k). P(k) in Expression (24) in Step S2106 represents a covariance matrix defined by the regression vector.

These expressions, tuning parameters, and the like in the system identification are an example. Further, in Expressions (20) to (24), unlike Expression (17), a matrix of φ is transposed instead of θ, but any matrix may be used.

After the process of Step S2106, the process proceeds to the determination process of Step S2101. Then, the system identification unit 1405 updates the tuning parameter of the statistical model 1404M on the basis of the calculation result.

As described above, the statistical model learning unit (system identification unit 1405) of this embodiment is obtained by applying the sequential least squares algorithm. Since the sequential least squares algorithm is a method (sequential calculation equation) of correcting the immediately preceding estimated value each time new data is obtained, it is possible to perform online estimation and real-time estimation of the rear oxygen sensor. In particular, since the successive least squares approximation algorithm with a variable forgetting element sets an evaluation function that is more important for data closer to the identification time, applicability to a system in which parameters change as in this embodiment is high.

Note that, although the sequential least squares algorithm is adopted as the parameter identification algorithm of this embodiment, the present invention is not limited thereto. That is, even when other optimization methods such as a gradient method and a genetic algorithm are applied as the parameter identification algorithm, a similar or close effect is obtained.

[Air-Fuel Ratio Correction Amount Calculation]

Figure 22:
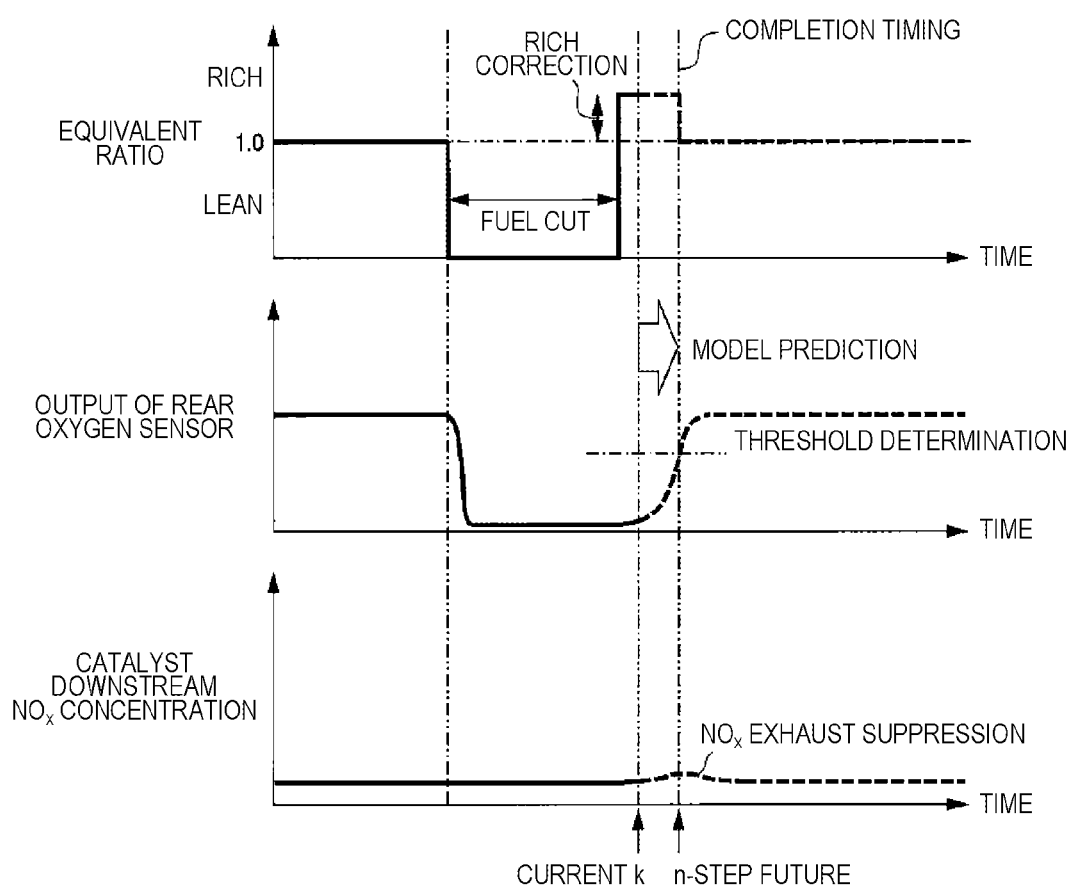
FIG. 22 is a diagram for explaining an air-fuel ratio correction amount calculation in an air-fuel ratio correction amount calculation unit shown in FIG. 14.

FIG. 22 is a diagram for explaining the air-fuel ratio correction amount calculation in the air-fuel ratio correction amount calculation unit 1406 shown in FIG. 14. In each graph of FIG. 22, the horizontal axis represents time, and the vertical axis represents an equivalent ratio (upper graph), a rear oxygen sensor output (middle graph), and a catalyst downstream NOx concentration (lower graph).

In each graph, a solid line indicates a behavior during past control, and a broken line indicates a behavior by future control. Here, a calculation method and an effect of the air-fuel ratio correction amount calculation unit 1406 will be described using the air-fuel ratio correction after the fuel cut as an example.

The air-fuel ratio correction amount calculation unit 1406 predicts the rear oxygen sensor output behavior in the n-step future based on the statistical model 1404M. As the tuning parameter of the statistical model 1404M used at this time, the latest dynamic characteristic of the post-processing system is considered by system identification. The air-fuel ratio correction amount calculation unit 1406 controls the completion timing of the rich correction after the fuel cut (n-step future from the current time k) in consideration of the timing (time k+n) at which the prediction value of the rear oxygen sensor output crosses A threshold Th set in advance. The current output value of the statistical model 1404M is expressed by Expression (25), and the future output value of the statistical model 1404M is expressed by Expression (26).

[Math. 10]

$$y[k] = -a_1 \cdot y[k-1] + b_1 \cdot y[k-1] \cdot |u[k-1]| + b_2 \cdot u[k-1] \quad (25)$$

[Math. 11]

$$y[k+n] = -a_1 \cdot y[k+n-1] + b_1 \cdot y[k+n-1] \cdot |u[k+n-1]| + b_2 \cdot u[k+n-1] \quad (26)$$

The air-fuel ratio correction amount calculation unit 1406 may calculate a prediction value of the rear oxygen sensor output by the statistical model 1404M for each step and determine whether to perform the rich correction on the basis of the calculation result. Alternatively, the prediction value of the rear oxygen sensor output by the statistical model 1404M may be calculated collectively for n steps to determine whether to perform the rich correction. Alternatively, the prediction value of the rear oxygen sensor output may be calculated collectively for n steps, and in a case where the prediction value of the rear oxygen sensor output exceeds the threshold, a step ((n-m) in the future) in which the prediction value of the rear oxygen sensor output does not exceed the threshold may be determined as the rich correction completion timing.

As described above, the air-fuel ratio correction amount calculation unit (air-fuel ratio correction amount calculation unit 1406) of this embodiment calculates the future catalyst downstream exhaust gas concentration information based on the learned statistical model (statistical model 1404M), and calculates the current air-fuel ratio correction amount or the correction period (completion timing) of the air-fuel ratio based on the variation amount (difference, ratio, or the like) between the future catalyst downstream exhaust gas concentration and the target value of the catalyst downstream exhaust gas concentration.

According to this embodiment configured as described above, in the method of stopping the air-fuel ratio correction after the output of the exhaust gas sensor (for example, the rear oxygen sensor) on the downstream side of the catalyst has actually changed, the problem of excessive rich correction can be appropriately avoided, and NOx emission can be suppressed, and excessive rich correction can also be prevented. Therefore, the emission of CO and HC can also be suppressed.

Further, since the completion timing of the rich correction is optimized on-board according to the deterioration state of the catalyst 21 and the exhaust gas sensor on the downstream side of the catalyst, the adaptation work for each deterioration catalyst is unnecessary, and the adaptation development man-hours can be greatly reduced. Further, the catalyst purification efficiency can be maintained at a high level by appropriate air-fuel ratio control, which also contributes to a reduction in the amount of catalyst used, that is, a reduction in the cost of the post-processing system.

[Air-Fuel Ratio Correction Amount Calculation and Fuel Injection Amount Control]

Figure 23:
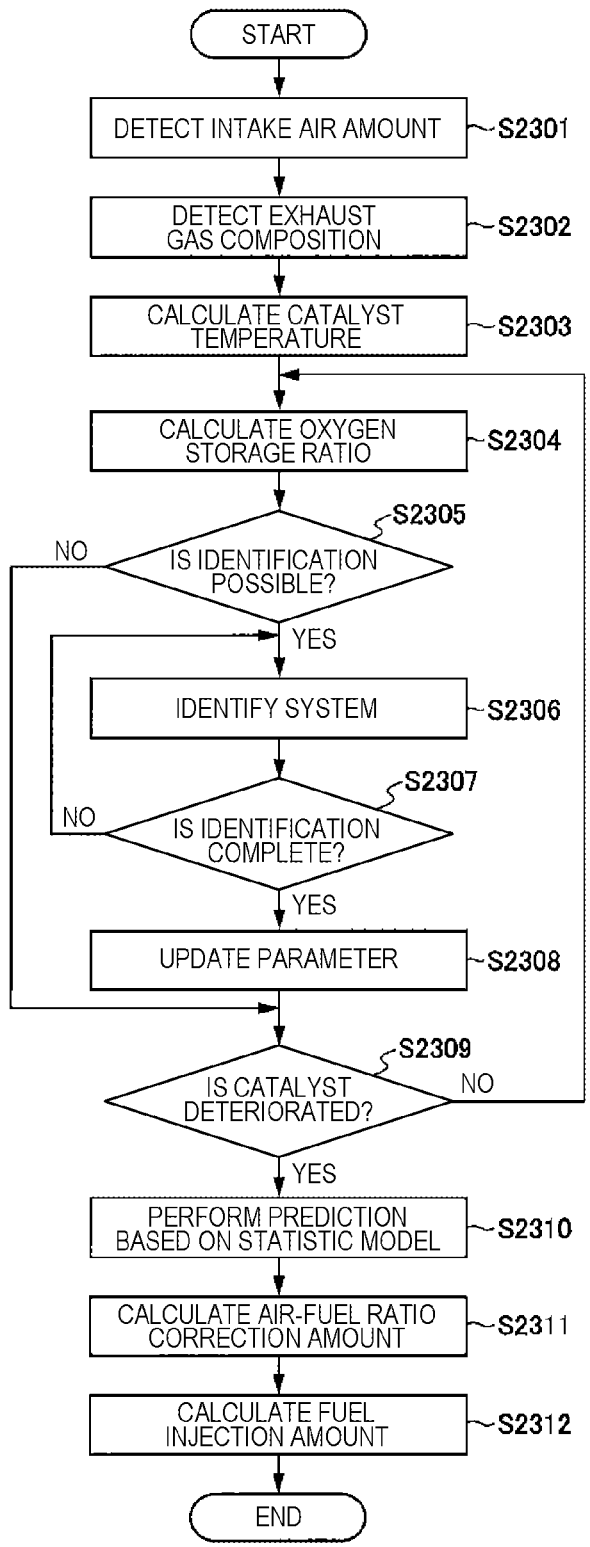
FIG. 23 is a flowchart illustrating an example of a procedure for calculating an air-fuel ratio correction amount based on a flow rate sensor detection value and a catalyst upstream/downstream exhaust gas sensor detection value and executing fuel injection amount control.

FIG. 23 is a flowchart illustrating an example in which the ECU 28 calculates an air-fuel ratio correction amount based on a flow rate sensor detection value and a catalyst upstream/downstream exhaust gas sensor detection value and executes fuel injection amount control.

First, the control unit 31 of the ECU 28 detects the intake air amount taken into the internal combustion engine 1 by the flow rate sensor 2 (S2301). Next, the catalyst boundary condition calculation unit 1401 of the ECU 28 detects the exhaust gas composition (catalyst upstream air-fuel ratio, catalyst downstream oxygen presence/absence state) by the exhaust gas sensors (Air-fuel ratio sensor 20 and oxygen sensor 22 in FIG. 1) assembled upstream and on the downstream side of the catalyst 21 (S2302).

Next, the catalyst temperature calculation unit 1402 calculates the catalyst temperature based on the current operating state of the internal combustion engine 1 (S2303). Next, the oxygen storage ratio calculation unit 1403 calculates the oxygen storage ratio on the basis of the information of the catalyst upstream exhaust gas composition, the catalyst temperature, the exhaust gas flow rate, and the oxygen storage capacity (S2304).

Next, the control unit 31 of the ECU 28 determines whether system identification can be performed on the basis of the operating state of the internal combustion engine 1 (S2305). The control unit 31 sets the identification permission flag to "1 (ON)" when identification is possible, and sets the identification permission flag to "0 (OFF)" when identification is impossible.

In a case where the control unit 31 determines that identification is impossible (NO in S2305), the processing proceeds to the determination processing in Step S2309. For example, an exhaust gas sensor operating state, a catalyst temperature range, an execution state of diagnosis processing, and the like are set as determination criteria of identification propriety. For example, the system identification processing is stopped before the start of the exhaust gas sensor immediately after the start of the engine. In addition, when the catalyst temperature is outside the predetermined range, the catalyst does not function normally, so that accurate system identification cannot be executed, and the identification processing is stopped. Further, the identification processing is stopped also at the time of diagnosis of the exhaust gas sensor related to the catalyst or the post-processing system.

As described above, the statistical model learning unit (system identification unit 1405) of this embodiment determines whether to learn the statistical model (statistical model 1404M) on the basis of any one of the operating state of the first exhaust gas sensor (for example, the air-fuel ratio sensor 20) and a second exhaust gas sensor (for example, the oxygen sensor 22), the catalyst temperature state, the catalyst deterioration diagnosis state, and the diagnosis states of the first exhaust gas sensor and the second exhaust gas sensor, and stops learning of the statistical model when it is determined that learning is impossible. As a result, it is possible to efficiently perform learning while avoiding a period in which the learning effect does not increase.

In a case where the control unit 31 determines that identification is possible (Yes in S2305), the system identification unit 1405 sequentially calculates the tuning parameter of the statistical model 1404M on the basis of the successive least squares approximation algorithm with variable forgetting element to perform system identification (S2306).

In this embodiment, as an example, the system identification unit 1405 (statistical model learning unit) is configured to learn the tuning parameter of the statistical model 1404M during the fuel cut operation according to the determination result of the control unit 31. At the time of fuel cut, the oxygen concentration in the exhaust gas increases, and the state of input and output fluctuates, so that highly accurate learning can be performed. Therefore, the rich correction (air-fuel ratio control) after the fuel cut can be more appropriately performed.

Next, the system identification unit 1405 determines whether system identification is completed based on the update status of the tuning parameter (the temporal change amount of the tuning parameter is equal to or less than a predetermined value) (S2307). In a case where the identification is not completed, the tuning parameter changes as the input and the output change. Therefore, even if the input and the output fluctuate, if the fluctuation of the tuning parameter is small, it can be determined that the identification is completed. Next, in a case of determining that the system identification is not completed (NO in S2307), the system identification unit 1405 returns to Step S2306 and continues the system identification processing.

Next, when it is determined that the system identification is completed (YES in S2307), the system identification unit 1405 updates the tuning parameter of the statistical model 1404M (S2308).

Next, in a case where it is determined in Step S2305 or after the process of S2308, the deterioration degree determination unit 1408 determines the deterioration state of the catalyst 21 based on the identified tuning parameter (S2309). The tuning parameters include information on the dynamic characteristics of the catalyst 21 and the exhaust gas sensor, and it is possible to determine whether the deterioration state of the catalyst 21 is appropriate (whether it is within an assumption of the statistical model 1404M) by capturing a change in the dynamic characteristics.

When it is determined that the deterioration of the catalyst has progressed (NO in S2309), the deterioration degree determination unit 1408 decreases the value of the oxygen storage capacity in the oxygen storage ratio calculation in Step S2304. Then, the processing of Steps S2304 to S2309 is executed again.

On the other hand, when it is determined that the catalyst 21 is not deteriorated (YES in S2309), the statistical model calculation unit 1404 calculates (predicts) the future exhaust gas sensor output on the downstream side of the catalyst based on the statistical model 1404M configured by the updated tuning parameter (S2310).

Next, the air-fuel ratio correction amount calculation unit 1406 calculates the air-fuel ratio correction amount based on the future exhaust gas sensor output on the downstream side of the catalyst by the statistical model 1404M (S2311).

Next, the target air-fuel ratio calculation unit 1407 calculates the target air-fuel ratio by adding the air-fuel ratio correction amount to the air-fuel ratio control amount. Then, the control unit 31 of the ECU 28 calculates the fuel injection amount by the fuel injection valve 15 based on the intake air amount so that the air-fuel mixture in the internal combustion engine 1 becomes the target air-fuel ratio (S2312). After the process of Step S2312 ends, the process of this flowchart ends.

Note that, in a case where the statistical model 1404M is not updated, the processing regarding system identification in Steps S2305 to S2308 can be omitted. However, as described in the description of FIG. 21, by controlling the air-fuel ratio using the statistical model 1404M updated to the latest state based on the measured value of the catalyst downstream exhaust gas sensor, the oxygen storage state in the catalyst 21 can be always maintained in a suitable state.

When the deterioration of the catalyst 21 is not considered, the deterioration determination process of the catalyst 21 in Step S2309 can be omitted.

As described above, the internal combustion engine control device (ECU 28) of this embodiment is an internal combustion engine control device that controls an internal combustion engine including the catalyst (exhaust purification catalyst 21) disposed in the exhaust pipe, the first exhaust gas sensor (for example, air-fuel ratio sensor 20) disposed on the upstream side of the catalyst, and the second exhaust gas sensor (for example, oxygen sensor 22) disposed on the downstream side of the catalyst. This internal combustion engine control device includes: an oxygen storage ratio calculation unit (oxygen storage ratio calculation unit 1403) that calculates an oxygen storage ratio of a catalyst based on a catalytic reaction model (for example, Reaction Expressions (9) to (11)) having at least a detection value of a first exhaust gas sensor as an input; a statistical model calculation unit (statistical model calculation unit 1404) that predicts a catalyst downstream exhaust gas concentration using a statistical model (statistical model 1404M) having an oxygen storage ratio (u) as an input and a catalyst downstream exhaust gas concentration (y) as an output; and an air-fuel ratio correction amount calculation unit (air-fuel ratio correction amount calculation unit 1406) that calculates an air-fuel ratio correction amount of an air-fuel mixture of the internal combustion engine based on a future catalyst downstream exhaust gas concentration calculated by the statistical model calculation unit.

In this embodiment configured as described above, the oxygen storage ratio based on the catalytic reaction model (physical model) is input to the statistical model, and the catalyst downstream exhaust gas concentration is predicted. By using the catalytic reaction model which is a physical model, the catalyst downstream exhaust gas concentration can be predicted up to a slightly earlier time (for example, several 10 seconds) according to the physical law. On the other hand, by using the statistical model, fine matching can be performed for a certain limited time (shorter time). As described above, by combining the catalytic reaction model (physical model) and the statistical model, the catalyst purification efficiency can be kept high, and deterioration of emission performance can be prevented.

In addition, the internal combustion engine control device (ECU 28) of this embodiment further includes a statistical model learning unit (system identification unit 1405) that learns (system identification) tuning parameters of the statistical model (statistical model 1404M) based on the detection value of the second exhaust gas sensor (for example, the oxygen sensor 22). With this configuration, the statistical model can always be updated to the latest state.

With such a configuration, the statistical model 1404M (tuning parameter) having the oxygen storage ratio of the catalyst 21 calculated based on the catalytic reaction model as an input and the catalyst downstream exhaust gas concentration as an output is always updated to the latest state based on the measured value of the catalyst downstream exhaust gas sensor. Then, since the air-fuel ratio can be controlled based on the future catalyst downstream exhaust gas concentration predicted by the updated statistical model 1404M, the oxygen storage state in the catalyst 21 can be always maintained in a suitable state. As a result, even when the catalyst 21 or the catalyst downstream exhaust gas sensor deteriorates, deterioration of emission performance can be appropriately prevented.

In addition, the internal combustion engine control device (ECU 28) of this embodiment further includes a deterioration degree determination unit (deterioration degree determination unit 1408) that determines the deterioration degree (catalyst deterioration degree) of the catalyst based on the tuning parameter of the learned statistical model (statistical model 1404M). For example, the deterioration degree determination unit may output the catalyst deterioration diagnosis result based on the deterioration degree and the deterioration state assumed in the statistical model.

The determination of the degree of catalyst deterioration in this manner contributes to setting of the oxygen storage capacity ($\psi$cap) according to the catalyst deterioration degree in the oxygen storage ratio calculation unit (oxygen storage ratio calculation unit 1403). For example, by outputting the stepwise evaluation of the catalyst deterioration diagnosis result (for example, new, not so new, old) to the oxygen storage ratio calculation unit, the oxygen storage capacity ($\psi$cap) can be set stepwise in the oxygen storage ratio calculation unit, and the oxygen storage ratio can be calculated based on the state of the catalyst.

In addition, the oxygen storage ratio calculation unit (oxygen storage ratio calculation unit 1403) of this embodiment has, as a parameter, an oxygen storage capacity corresponding to the amount of metal (platinum, rhodium, etc.) carried in the catalyst 21, and sets the oxygen storage capacity according to the catalyst deterioration degree.

As described above, by setting the oxygen storage capacity according to the catalyst deterioration, the accuracy of the calculation result of the oxygen storage ratio is improved, and a highly accurate oxygen storage ratio can be input by the statistical model (statistical model 1404M).

2. Others

Further, the present invention is not limited to each of the above-described embodiments, and it goes without saying that various other application examples and modifications can be taken without departing from the gist of the present invention described in the claims.

For example, the above embodiments describe the engine system in detail and specifically for easy understanding the present invention, but not necessarily limited to those including all the components described. In addition, some of the configurations of each embodiment may be omitted, replaced with other components, and added to other configurations.

In addition, some or all of the configurations, functions, and processing units may be realized in hardware such as an integrated circuit.

REFERENCE SIGNS LIST 1 internal combustion engine
2 flow rate sensor
20 air-fuel ratio sensor
21 exhaust purification catalyst
22 oxygen sensor
28 ECU
31 control unit
31a CPU
1401 catalyst boundary condition calculation unit
1402 catalyst temperature calculation unit
1403 oxygen storage ratio calculation unit
1404 statistical model calculation unit
1404M statistical model
1405 system identification unit
1406 air-fuel ratio correction amount calculation unit
1407 target air-fuel ratio calculation unit
1408 deterioration degree determination unit
1501 exhaust gas flow rate calculation unit
1502 exhaust gas temperature calculation unit
1601 exhaust gas/catalyst heat transfer amount calculation unit
1602 catalyst/atmosphere heat transfer amount calculation unit
1603 catalyst reaction generation heat amount calculation unit
1604 catalyst heat balance calculation unit
1605 catalyst temperature calculation unit
1700 exhaust gas concentration calculation unit
1701 $O_2$ reaction rate/concentration calculation unit
1702 CO reaction rate/concentration calculation unit
1703 oxygen storage ratio transition calculation unit
1800 catalyst temperature/oxygen storage ratio calculation unit
1801, 1803, 1805 exhaust gas temperature/catalyst temperature calculation unit
1802, 1804, 1806 $O_2$/CO concentration/oxygen storage ratio calculation unit
1807 average oxygen storage ratio calculation unit 1807
2010 input nonlinear element
2020 linear transient model
2030 output nonlinear element

The invention claimed is:

1. An internal combustion engine control device that controls an internal combustion engine including a catalyst disposed in an exhaust pipe, a first exhaust gas sensor disposed on an upstream side of the catalyst, and a second exhaust gas sensor disposed on a downstream side of the catalyst, the internal combustion engine control device comprising:
an oxygen storage ratio calculation unit which receives a catalytic reaction model having at least a detection value of the first exhaust gas sensor as an input and calculates an oxygen storage ratio of the catalyst;

a statistical model calculation unit that uses a statistical model having the oxygen storage ratio as an input to predict a catalyst downstream exhaust gas concentration; and an air-fuel ratio correction amount calculation unit that receives a future catalyst downstream exhaust gas concentration calculated by the statistical model calculation unit and calculates an air-fuel ratio correction amount of an air-fuel mixture of the internal combustion engine, wherein a hysteresis term reflecting a characteristic in which a response speed of the output is different between when the input increases and when the input decreases is set to an input element of the statistical model, the hysteresis term includes a term defined by a first input parameter that takes both a positive value and a negative value, and a second input parameter defined by a product of an output parameter that takes a positive value and an absolute value of the first input parameter, and an air-fuel ratio is corrected in accordance with the air-fuel ratio correction amount to thereby increase a purification efficiency of the catalyst.

2. The internal combustion engine control device according to claim 1, wherein the catalytic reaction model receives at least the detection value of the first exhaust gas sensor, a catalyst temperature, and an exhaust gas flow rate on the upstream side of the catalyst in the exhaust pipe as inputs.

3. The internal combustion engine control device according to claim 1, wherein the catalytic reaction model is defined by a reaction rate between at least oxygen on the upstream side of the catalyst, carbon monoxide on the upstream side of the catalyst, and a metal carried in the catalyst.

4. The internal combustion engine control device according to claim 3, wherein the oxygen storage ratio calculation unit includes:

an oxygen concentration calculation unit that calculates an oxygen concentration on the upstream side of the catalyst based on the detection value of the first exhaust gas sensor on the upstream side of the catalyst; and a carbon monoxide concentration calculation unit that calculates a carbon monoxide concentration on the upstream side of the catalyst based on the detection value of the first exhaust gas sensor on the upstream side of the catalyst.

5. The internal combustion engine control device according to claim 3, wherein the oxygen storage ratio calculation unit has, as a parameter, an oxygen storage capacity corresponding to an amount of the metal carried in the catalyst, and sets the oxygen storage capacity according to a catalyst deterioration degree.

6. The internal combustion engine control device according to claim 1, wherein a sigmoid function is set to an output element of the statistical model.

7. The internal combustion engine control device according to claim 1, wherein an additional input parameter of the catalytic reaction model includes a catalyst temperature.

8. The internal combustion engine control device according to claim 1, further comprising a statistical model learning unit that learns a parameter of the statistical model based on the detection value of the second exhaust gas sensor.

9. The internal combustion engine control device according to claim 8, wherein a sequential least squares algorithm is applied to the statistical model learning unit.

10. The internal combustion engine control device according to claim 8, wherein the air-fuel ratio correction amount calculation unit calculates future catalyst downstream exhaust gas concentration information based on the learned parameter of the statistical model, and calculates the current air-fuel ratio correction amount or a correction period of the air-fuel ratio based on a variation amount between the future catalyst downstream exhaust gas concentration and a target value of the catalyst downstream exhaust gas concentration.

11. The internal combustion engine control device according to claim 8, wherein the statistical model learning unit determines whether to learn the statistical model based on any one of an operating state of the first exhaust gas sensor and the second exhaust gas sensor, a catalyst temperature state, a catalyst deterioration diagnosis state, and a diagnosis state of the first exhaust gas sensor and the second exhaust gas sensor, and stops learning of the statistical model when determining that learning is impossible.

12. The internal combustion engine control device according to claim 8, further comprising a deterioration degree determination unit that determines a deterioration degree of the catalyst based on the learned parameter of the statistical model, wherein the deterioration degree determination unit outputs a catalyst deterioration diagnosis result based on the deterioration degree and a deterioration state assumed in the statistical model.

13. The internal combustion engine control device according to claim 8, wherein the statistical model learning unit learns the parameter of the statistical model during a fuel cut operation.

* * * * *